United States Patent [19]

Enomoto et al.

[11] Patent Number: 5,682,542
[45] Date of Patent: Oct. 28, 1997

[54] LANGUAGE PROCESSING SYSTEM USING OBJECT NETWORKS

[75] Inventors: Hajime Enomoto; Minoru Kamoshida, both of Kawasaki, Japan

[73] Assignee: Fujitsu Limited, Kawasaki, Japan

[21] Appl. No.: 279,861

[22] Filed: Jul. 26, 1994

Related U.S. Application Data

[63] Continuation of Ser. No. 19,272, Feb. 18, 1993, abandoned.

[30] Foreign Application Priority Data

Feb. 21, 1992 [JP] Japan ................... 4-034864

[51] Int. Cl.$^6$ ................................... G06F 17/21
[52] U.S. Cl. ........................... 395/778; 395/759
[58] Field of Search ................ 364/419.01, 419.08; 395/131, 133, 134, 135, 157, 759, 751, 752, 778

[56] References Cited

U.S. PATENT DOCUMENTS

| | | | |
|---|---|---|---|
| 4,914,590 | 4/1990 | Loatman et al. | 395/759 |
| 4,991,117 | 2/1991 | Iwamura et al. | 395/134 |
| 5,101,349 | 3/1992 | Tokuume et al. | 395/759 |
| 5,119,475 | 6/1992 | Smith et al. | 395/156 |
| 5,123,103 | 6/1992 | Ohtaki et al. | 395/600 |
| 5,133,052 | 7/1992 | Bier et al. | 395/133 |
| 5,237,502 | 8/1993 | White et al. | 395/751 |
| 5,268,839 | 12/1993 | Kaji | 395/753 |

OTHER PUBLICATIONS

System Sciences, 1988 Annual Hawaii Int'l Conf, vol. II, IEEE Cat. No. ThO212–1/88/0000/0754, pp. 754–763, Seki et al., "A Processing System for Program Specifications in a Natural Language".

Computers and Communications, 1988 Int'l Phoenix Conf., IEEE Cat. No. 0896–582X/87/0000/0262, pp. 262–268, Tokuta et al., "A Linguistic Model for Computer".

Kamoshida et al., "Window–based elaboration language for picture processing and painting," reprinted from SPIE vol. 1606 Visual Communications and Image Processing '91: Image Processing, Boston, MA, Nov. 11–13, 1991, pp. 951–960.

Kamoshida et al., "Color picture processing and painting language–WELL–PPP and its application to painting process," First Korea–Japan Joint Conference on Computer Vision, Seoul, Korea, Oct. 10–11, 1991, pp. vii–xii and 31–37.

Moriya et al., "Concurrent Schema of Cooeprative Picture Painting System," reprinted from SPIE vol. 1818 Visual Communications and Image Processing '92, Boston, MA, Nov. 18–20, 1992, pp. 1531–1544.

44th Information Processing Institute by the Information Processing Society of Japan, Feb. 24, 1992, pp. 5–67 to 5–76.

Proc. 11th Int. Conf. on Software Engineering, May 16, 1989, IEEE, Washington, D.C., USA, pp. 64–73 XP89422, Motoshi Saeki et al., "Software development process from natural language specification".

(List continued on next page.)

Primary Examiner—Gail O. Hayes
Assistant Examiner—Steven R. Yount
Attorney, Agent, or Firm—Staas & Halsey

[57] ABSTRACT

A language processing system using object networks in a computer system which manages and processes as objects the data to be operated on and the functions operating on the data. The objects are classified roughly into noun objects and verb objects. An object network expressing the noun objects as nodes and the verb objects as branches is used as a reference model. In the reference model, when the content of a function of a verb object is made to act on a noun object existing at a certain node, a noun object in the direction of the branch corresponding to the name of the verb object, which is the object to be processed, is obtained, permitting a system for a specific field of application to be easily constructed.

10 Claims, 20 Drawing Sheets

OTHER PUBLICATIONS

Patent Abstract of Japan, vol. 5, No. 69 (P–060), May 9, 1981 & JP-A-56 017 467 (Fujitsu Ltd.), Feb. 19, 1981.

Proc. Conf. Infojapan '90: Information Technology Harmonizing with Society, vol. 2, Oct. 2, 1990, Amsterdam, Netherlands, pp. 25–32, Yuzuru Tanaka, "Vocabulary–Based Logic Programming", p. 31, right col., line 13–p. 32, left col., line 30.

Kamoshida et al., "Window–based elaboration language for picture processing and painting," reprinted from *SPIE vol. 1606 Visual Communications and Image Processing '91: Image Processing,* Boston, MA, Nov. 11–13, 1991, pp. 951–960.

Kamoshida et al., "Color picture processing and painting language-WELL–PPP and its application to painting process," *First Korea–Japan Joint Conference on Computer Vision,* Seoul, Korea, Oct. 10–11, 1991, pp. viii–xii and 31–37.

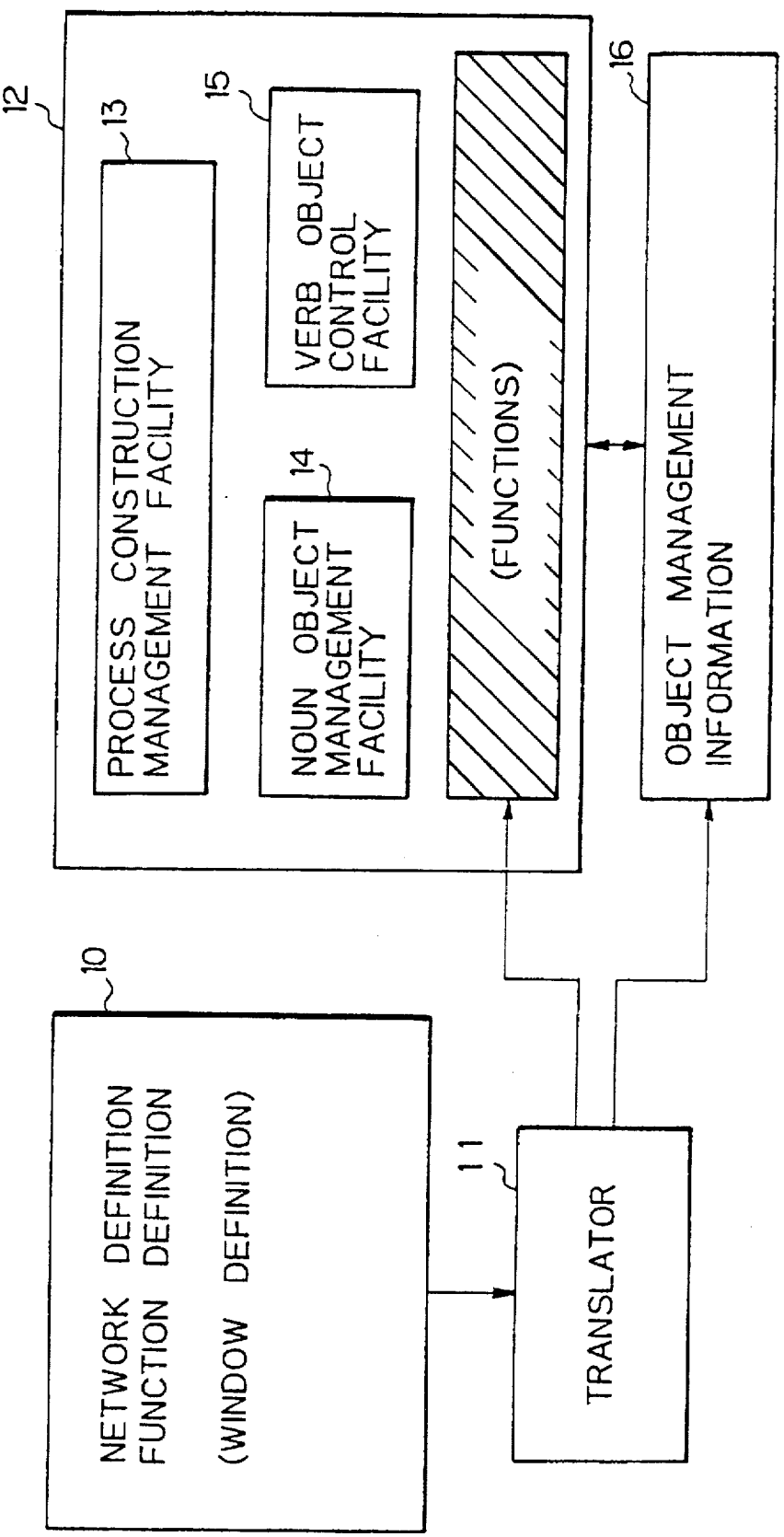

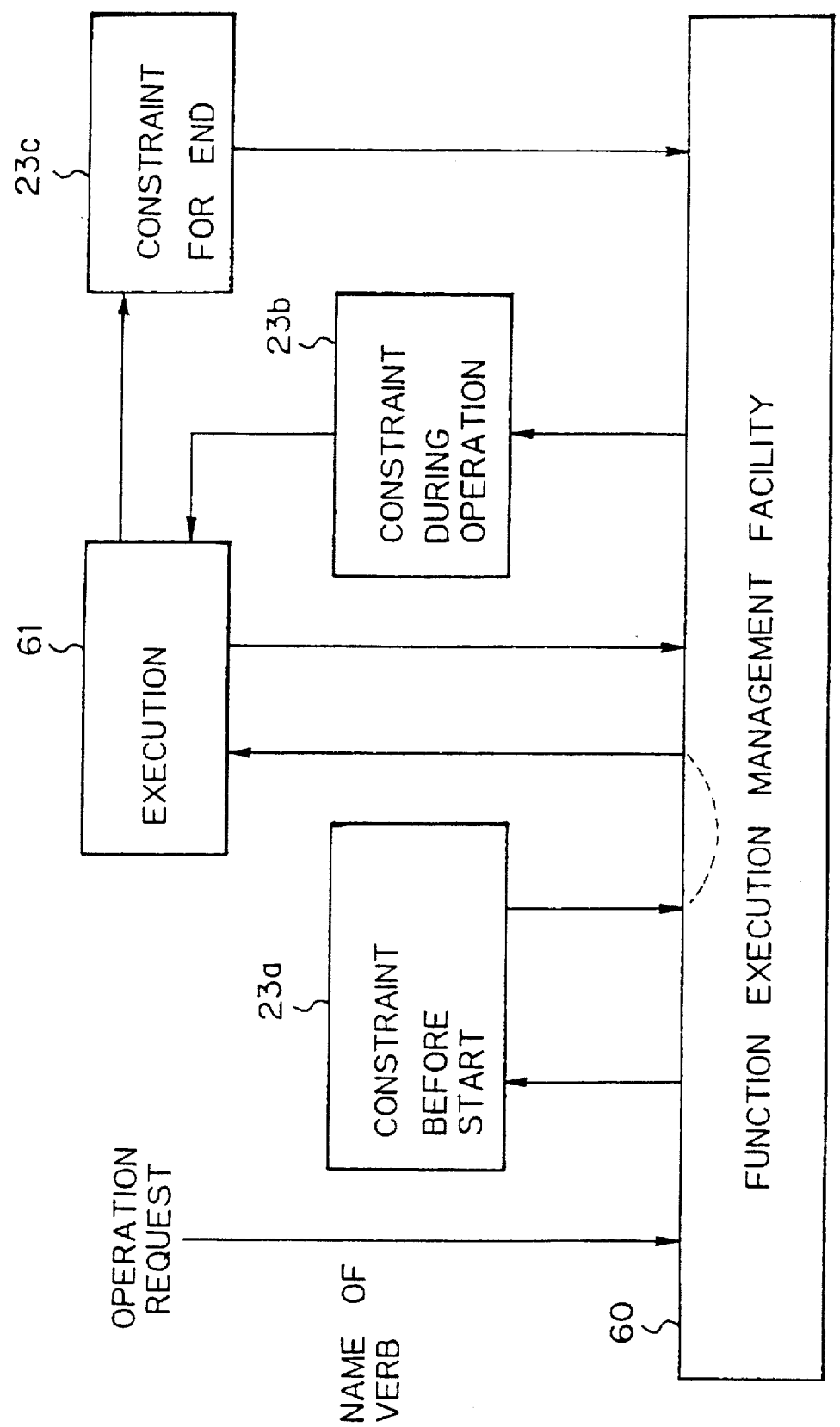

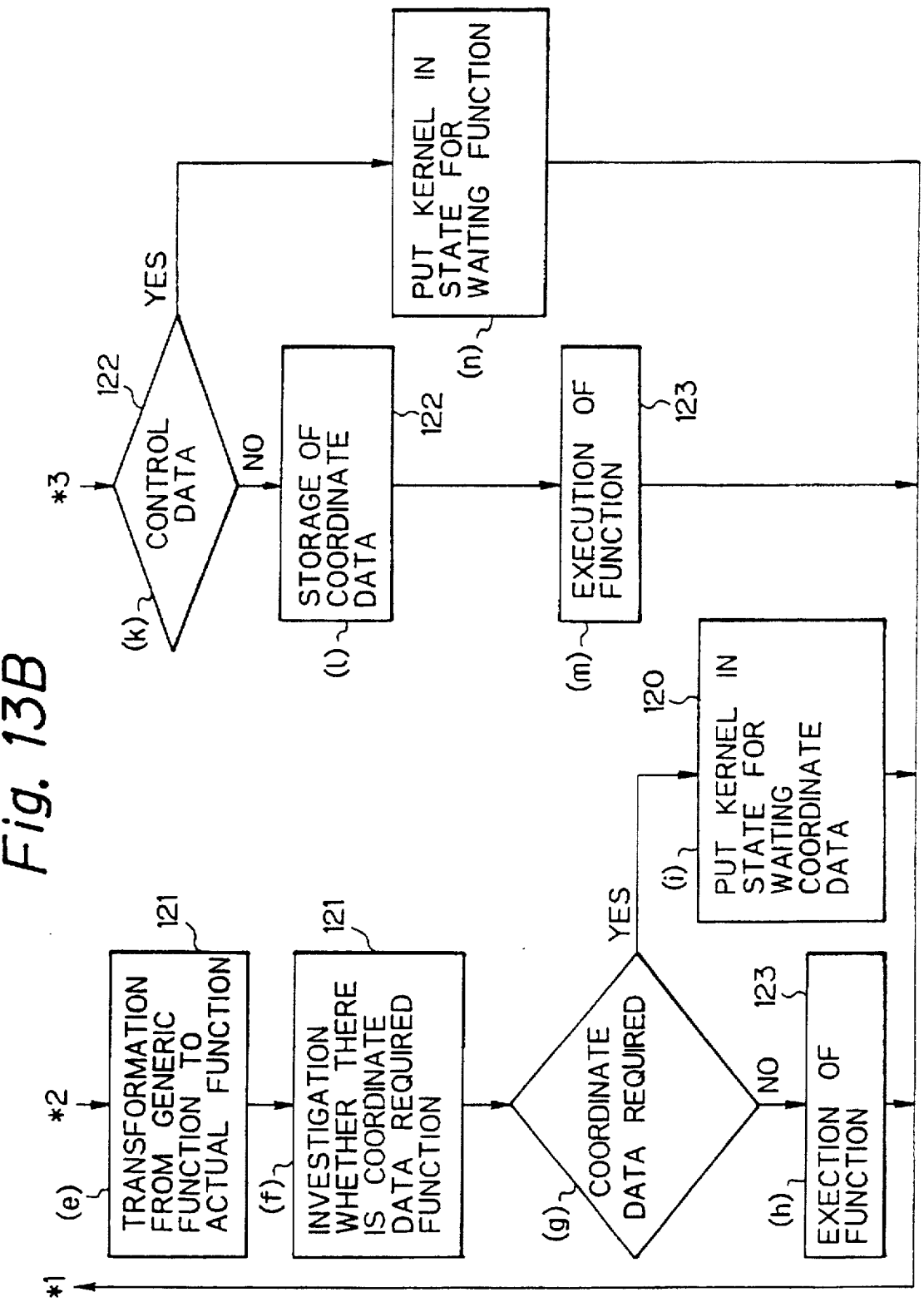

LANGUAGE PROCESSING SYSTEM USING OBJECT NETWORKS

This application is a continuation of application Ser. No. 08/019,272, filed Feb. 18, 1993, now abandoned.

BACKGROUND OF THE INVENTION

1. Field of the Invention

The present invention relates to a language processing system using object networks in a computer system. The computer system manages and processes as objects, the data to be operated on and the means of operating the data, which enables the easy construction of a system for a certain specific field of application.

2. Description of the Related Art

Along with the rapid advances made in computers, the ratio of software in the overall costs of a system has been rising. As systems become larger in size, the labor required by the software developers has been increasing exponentially, precipitating a continued "software crisis". In much of the previous software development work, the system being developed was expressed by describing the processing procedure, i.e., the emphasis was on programming. This has become a factor obstructing resolution of the software crisis.

As opposed to this, the software concept of "object orientation", where one does not think in terms of procedure, but thinks basically of the object of the processing and operation, has been brought into the computer world and is now coming under attention.

This method of construction of software by object orientation is now the subject of much research and development. There has not yet been sufficient research and development into language processing systems which enable systems of specific fields of application, such as for example, graphic systems, to be easily described and constructed with object orientation.

Thus, when developing systems for particular fields of application such as graphic systems and systems handling multimedia, conventional development using general purpose languages is insufficient considering the productivity and the reliability of the software. Further, it is difficult to customize the software as a package. In addition, there is the problem that it is difficult to construct a user-friendly system.

SUMMARY OF THE INVENTION

Therefore, the object of the present invention is to solve the above-mentioned problems and to improve the productivity and flexibility of software and enable the easy construction of a user-friendly system. This is accomplished by the provision of a language processing system which creates a model of a system of a specific field of application, as an object network, and uses a description of the same to perform the desired processing.

To attain the above object, the present invention provides a language processing system using object networks in a computer system which manages, and processes as objects, the data to be operated on and the means of operating on that data, wherein the objects are classified roughly into noun objects and verb objects. An object network expressing the noun objects as nodes and the verb objects as branches is used as a reference model. In the reference model, when the content of a function of a verb object is made to act on a noun object existing at a certain node, a noun object in the direction of the branch corresponding to the name of the verb object, which is the object to be processed, is obtained.

BRIEF DESCRIPTION OF THE DRAWINGS

The above object and features of the present invention will be more apparent from the following description of the preferred embodiments with reference to the accompanying drawings, wherein:

FIGS. 1A, 1B, 1C, and 1D are views for explaining the principle of the object network according to the present invention;

FIG. 6 is a view for explaining the execution and management of a verb object in an embodiment of the present invention;

FIGS. 13A and 13B are flow charts showing an example of the operation of the execution system 12;

DESCRIPTION OF THE PREFERRED EMBODIMENTS

The embodiments of the present invention will be described next with reference to the related figures.

FIGS. 1A, 1B, 1C, and 1D are views for explaining the principle of an object network according to the present invention.

In FIGS. 1A to 1D, 10 is a system description using a field description language, 11 is a translator, 12 is an execution system, 13 is a process construction management facility, 14 is a noun object management facility for managing noun objects, 15 is a noun object control facility having a function of controlling the execution of the noun objects, 16 is an object management information defining the object networks, 20 is an object network, 21 is a noun object, 22 is a verb object, 23 is a constraint, 24 is a generic function, and 25 is an actual function.

Figure 1B:
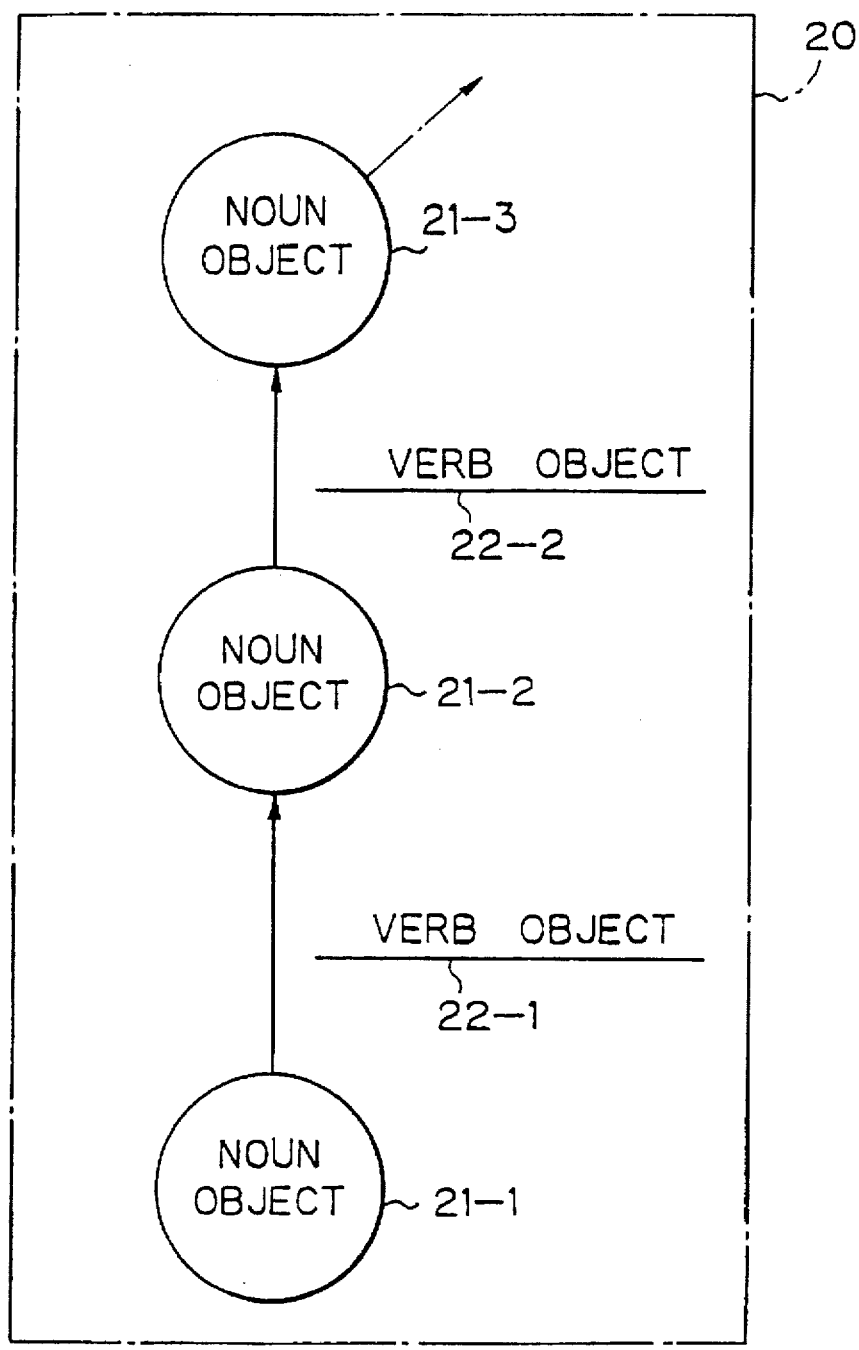

The present invention provides a computer system (FIG. 1A) which manages and processes as objects the data to be operated on and the means of operating on that data. The objects are classified roughly into noun objects 21-1, 21-2, ... and verb objects 22-1, 22-2 ... as shown in FIG. 1B. An object network 20 expressing the noun objects as nodes and the verb objects as branches is used as a reference model. In the reference model, when the content of a function of a verb object is made to act on a noun object existing at a certain node, a noun object in the direction of the branch corresponding to the name of the verb object, which is the object to be processed, is obtained.

The noun objects include integrated objects 21 (FIG. 1C) corresponding to common nouns and individual objects (FIG. 1C) corresponding to proper nouns. There is a noun object management facility 14 (FIG. 1A) which names these or differentiates between them by a reference indication function.

The noun object management facility 14 (FIG. 1A) has a modification management facility which adds to the noun objects constraints as adjectives modifying the noun objects and manages the same as objects. This modification management facility has a means for judging if the nature of a noun object to which an actual individual noun object belongs and the constraints modifying the same are compatible.

The verb objects 22 (FIG. 1B) come in at least three types by functions: operation verbs which perform operations for combining data and other constraints to a certain object so as to specify a noun object as the object to be processed, relation added verbs which act on groups of individual objects constituting an integrated object so as to generate noun objects with new relation, and limited operation verbs which give specific constraints by a noun object combined with a preposition defining the nature of the constraints and performs an operation on the noun object to be processed so as to satisfy the limitation. These are constituted so as to be judged and processed in sentence units (see later mentioned FIGS. 4A to 4C).

Figure 1C:
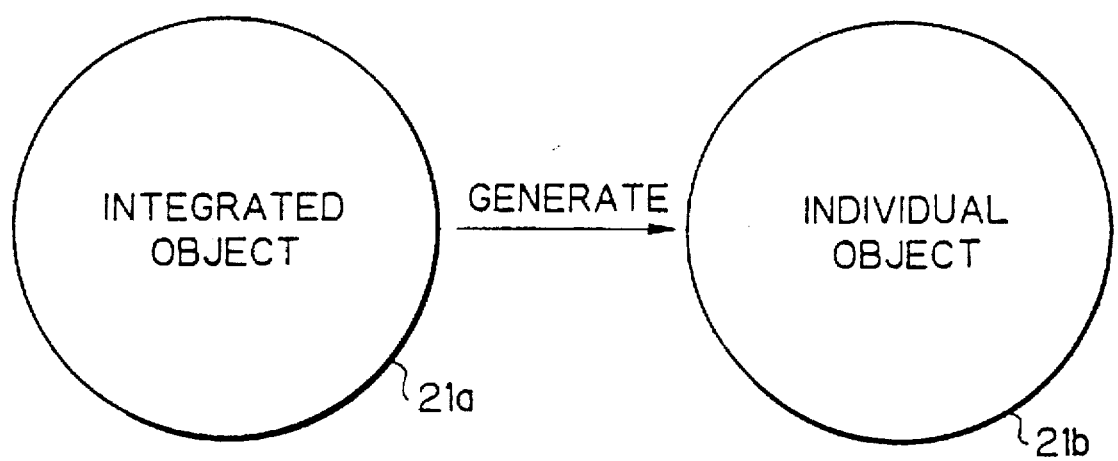
Figure 1D:
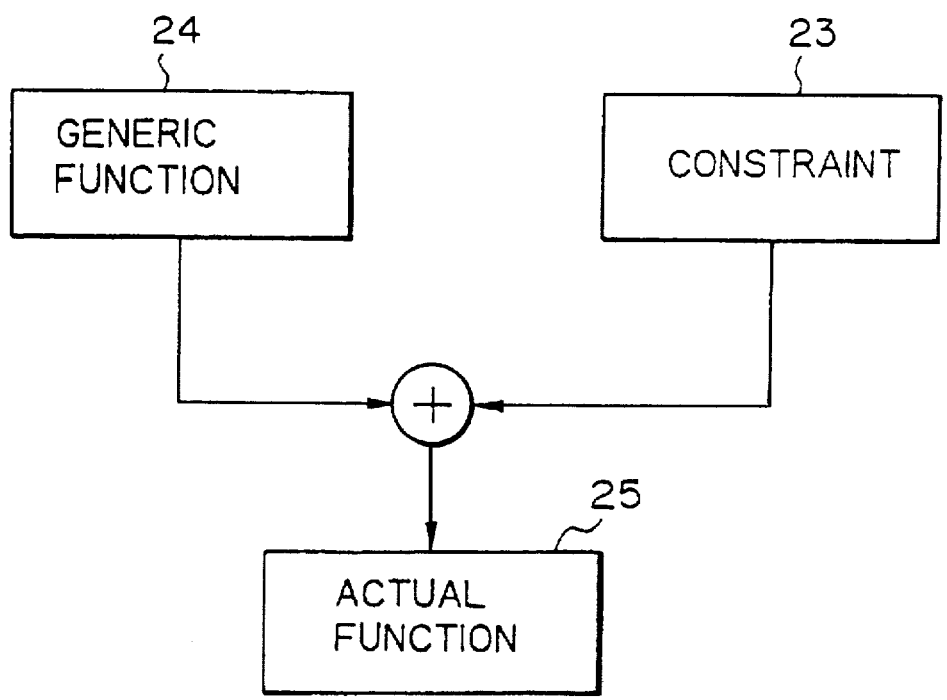

The verb objects comes in two types: generic functions 24 and actual functions 25 (FIG. 1D). The actual functions 25 are functions which can perform the processing for actually executing noun objects as an object to be processed. The generic functions 24 are transformed to actual functions 25 by being given constraint 23. The verb object control facility 15 (FIG. 1A) performs control for this transformation from a generic function 24 to an actual function 25.

The verb object control facility 15 has the function of imposing as constraints 23 on a verb object corresponding to a generic function 24 the name of the noun object, as the status name, on which processing has finished being executed at present. This gives an executable actual function 25.

The verb object control facility 15, further, as shown in FIG. 6, has a function execution management facility. The function execution management facility has a means which imposes constraints for the start, the duration, and the end of an operation when causing the verb objects to act as functions and which check the validity of the same at each point of time. The constraint of a generic function 24 is a generic condition. This is transformed to an actual function 25 by definition of an actual constraint 23 in addition to this. This system is characterized by have a control function for successively judging the validity during process of transformation and for generating a transformation procedure for the transformation (see FIG. 3).

The integrated objects corresponding to common nouns in the object network 20 represent groups of individual objects corresponding to specialized proper nouns, so if a limitation is given from elsewhere as data to a noun object having the name of an integrated object, separate individual objects are generated (FIG. 1C). Therefore, the object network used as the reference model (FIG. 1B) is a network showing a structure which generates individual objects by execution of specific actual functions from state of the integrated objects in the same, expresses relations between elements, and thereby constructs element networks (see FIG. 7A). In an element network*, processing is performed in practice by requesting the execution of individual objects. The process construction management facility 13 (FIG. 1A) generates and manages these networks.

In the process construction management facility 13, the constraints on the processing routine are defined by the orientations of the verb objects in the object network 20 formed. At the same time, it is judged that the verb object with a possibility token (see FIG. 8) indicating that the object is next executable can be concurrently processed, a request for actuation is received for that verb object, and control is performed for concurrent processing so as to actually execute the same.

The verb objects in the object network 20 having portions defining the construction are actuated, the corresponding element network is made, and data regarding that element objects is added as a constraint. The process is executed by concurrent execution based on a request for the verb object from inside or outside the system and limitations on the order of processing and based on the indication control of the process construction management facility 13 (FIG. 1A).

The process construction management facility 13 (FIG. 1A) newly generates a structure network based on the structure network used as the reference model, explained later in FIG. 7A, modifies and revises the constraints of the object network 20 used as the reference model in accordance with other system requests, defines constraints of the newly generated object network, and prepares to receive from other systems the requests to element networks based on the processing routine to be performed by the structure network completed as a result, thereby consigns the right of control to the element network, receives the fact of completion of the processing as a result, and erases the structure network. This operation is designed so that the element network is simultaneously completed. The results of the processing are displayed on other systems.

The function execution management facility, which executes functions corresponding to requests, by making pairs of requests and responses, such as a request for processing for generation of a structure network from the processing construction management facility 13 and the resultant response or a request for processing for generation of an element network from the structure network and the response to the same, performs services in the manner of a request to a lower layer network or a response to a higher layer network (see FIG. 6). The function execution management facility performs transformations from generic functions to actual functions and control of the indication for checking the validity in execution. If the result is that it is incomplete, a new pair of a request and response is conversely issued to a higher layer network to complete the same. If complete, it is executed and processing is performed for the response to the higher layer network.

The language processing system using the object network is implemented in the following way, for example. The system description 10 using the field description language shown in FIG. 1A is used to define the object network 20 shown in FIG. 1B, to define the generic functions 24, actual functions 25, and constraints 23 corresponding to the verb object, or to define the windows for the man-machine interface in accordance with need. The definitions are applied to the translator 11 (FIG. 1A) and transformed to object management information 16 expressed by the internal language or, alternatively, the defined group of functions are incorporated in the execution system 12, whereby a system for a specific field of application is automatically constructed.

The principle of the invention discussed above may be summarized as follows:

From the standpoint of both the system designers and users, it is preferable to construct a system based on the data using an object orientation. Therefore, processing inside the system is grasped in terms of the step-by-step transformation of data and the transformations at each step are considered as functions. If the steps of the data are considered nodes and the functions branches, it is possible to view the whole as a network (FIG. 1B).

That is, if the software system is expressed as a network, the nodes, that is, the constituent elements of the systems, are the noun objects (data), while the branches, or the connective relations among elements, are verb objects. The verb objects are expressed as transformation functions among the nodes, which transformation functions are also expressed by networks. The networks themselves can be viewed as objects and are relative functions of the higher order networks. That is, there is a network hierarchy.

From this, in the present invention, the constituent elements of the system are treated as objects, the objects are classified into noun objects and verb objects. The object network 20 built using these is used as a reference model (FIG. 1B) for processing the object in question.

Figure 2A:
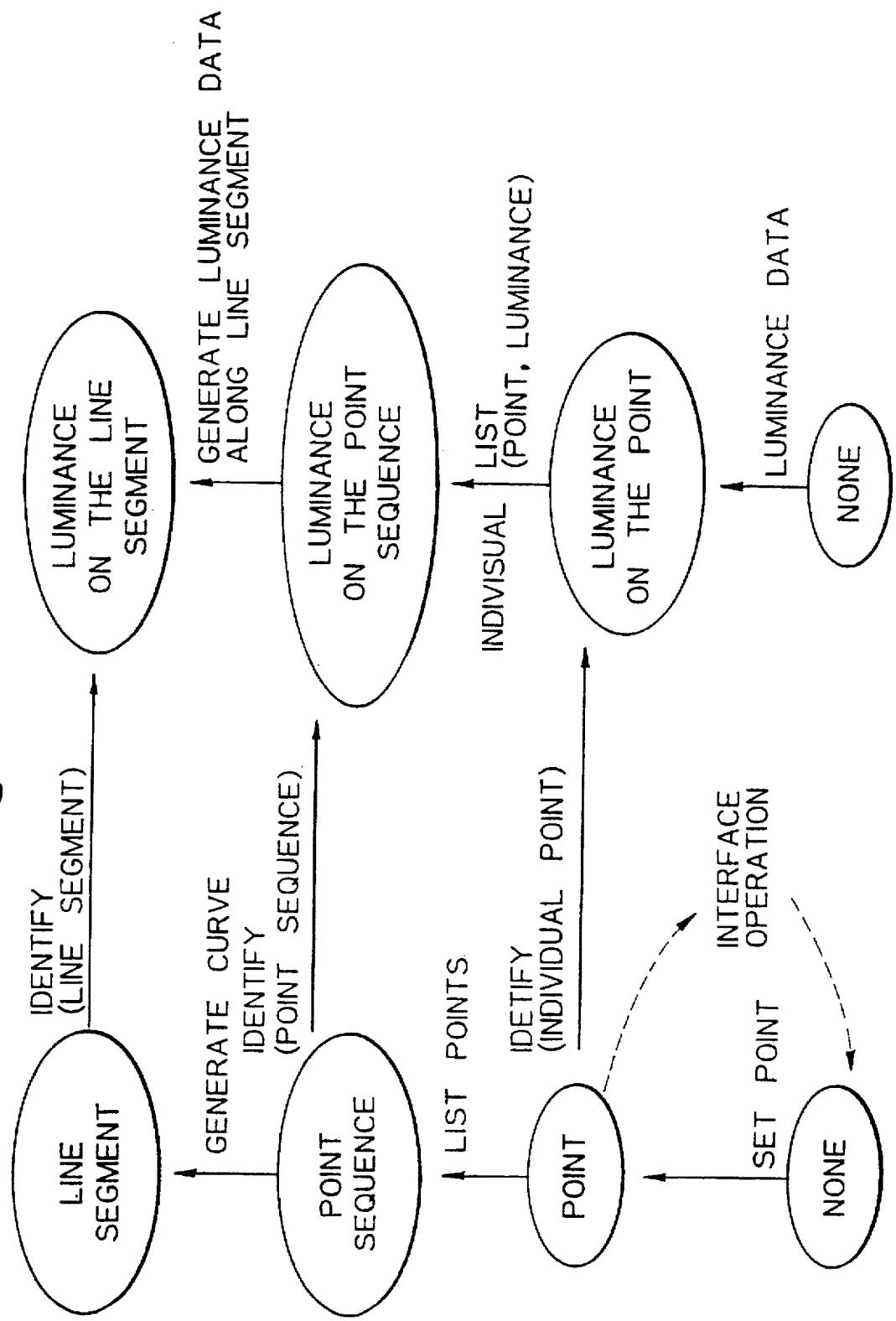
FIGS. 2A, 2B, 2C, and 2D are views for explaining an example of a reference model of an object network.
Figure 2B:
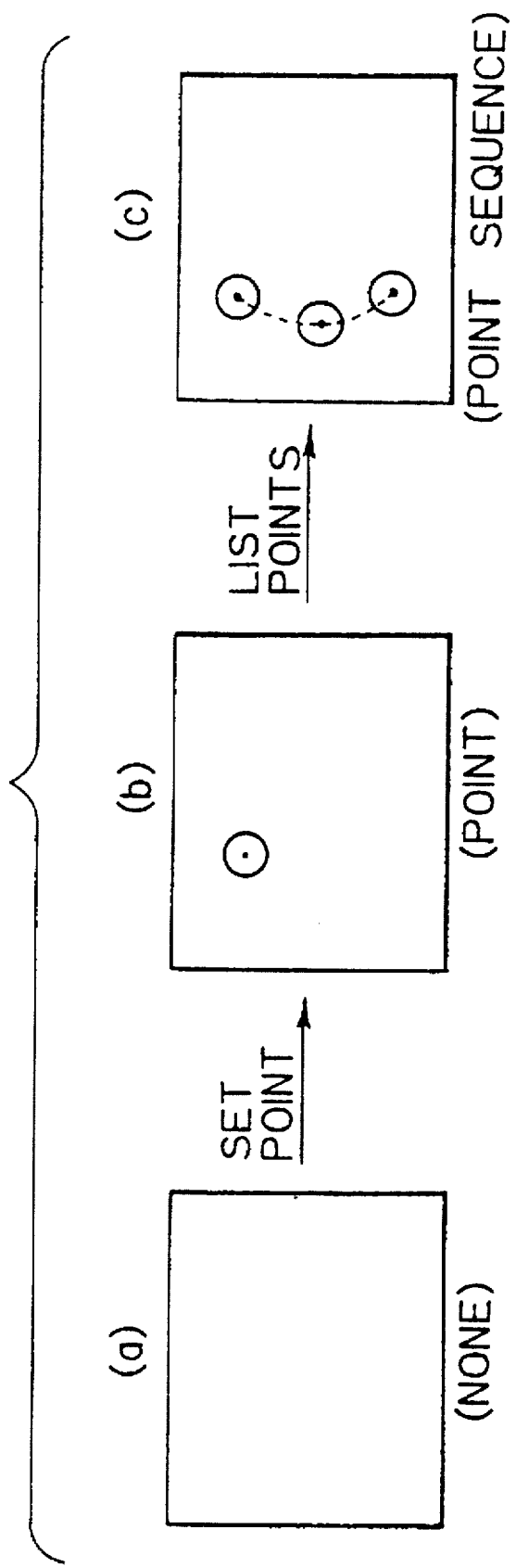
Figure 2C:
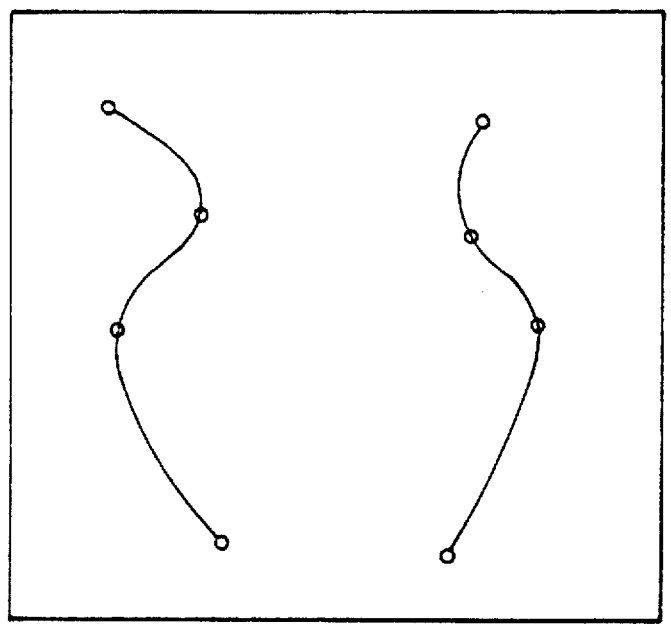
Figure 2D:
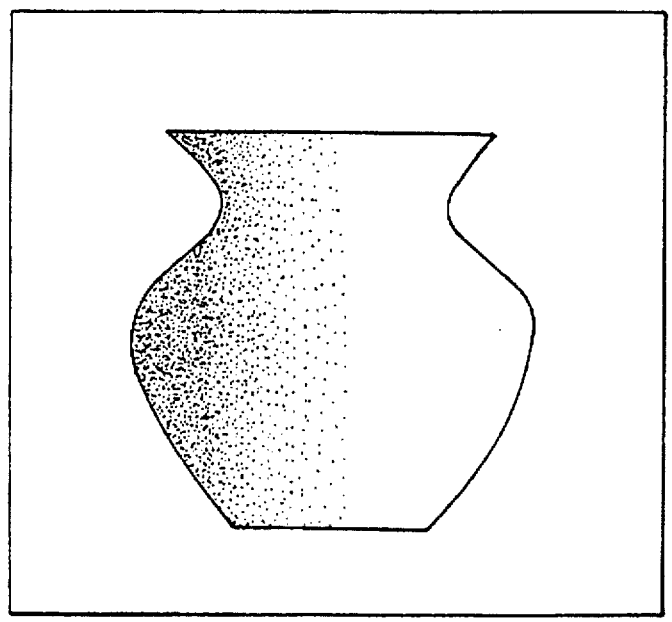

FIGS. 2A, 2B, 2C, and 2D are views for explaining an example of a reference model of an object network. An explanation will be given of the example of a graphic system as the specific field mentioned earlier. FIG. 2D shows the graphic image (pot) finally completed on the display screen of a work station. FIG. 2C shows the initial state when the pot of FIG. 2D began to be drawn. FIG. 2B shows part of the state of FIG. 2C. FIG. 2A shows an actual example of the reference model of FIG. 1B.

Referring to FIG. 2B, first, in state (a) of nothing is on the screen. A mouse is used to designate a point, resulting in the state (b) with the point drawn. Several points are further designated, resulting in the state (c) with a point sequence.

If the points, point sequence, and other data are treated as noun objects, by making a verb object (for example, "list points") act as a function on a certain noun object (for example, "point"), it is possible to consider that the desired noun object (for example, "point sequence") is obtained. That is, as shown in FIG. 2A, if the states of the data to be drawn are placed at the nodes used as noun objects and the branches connecting the nodes are made the verb objects to form an object network, it becomes possible to construct a a graphic system for drawing images using the object network.

For example, a noun object (point) corresponding to an abstract point concept with specific coordinate values not yet set is treated as an integrated object corresponding to a common noun. A noun object actually given point coordinate values and thus having individuality is treated as an individual object (21b in FIG. 1C) corresponding to a proper noun generated from the integrated object (21a in FIG. 1C). Therefore, a large number of individual objects are derived from a single integrated object. The object network 20 defined by the system description 10 using the field description language shown in FIG. 1A in this sense is a reference model (FIG. 1B).

Figure 3:
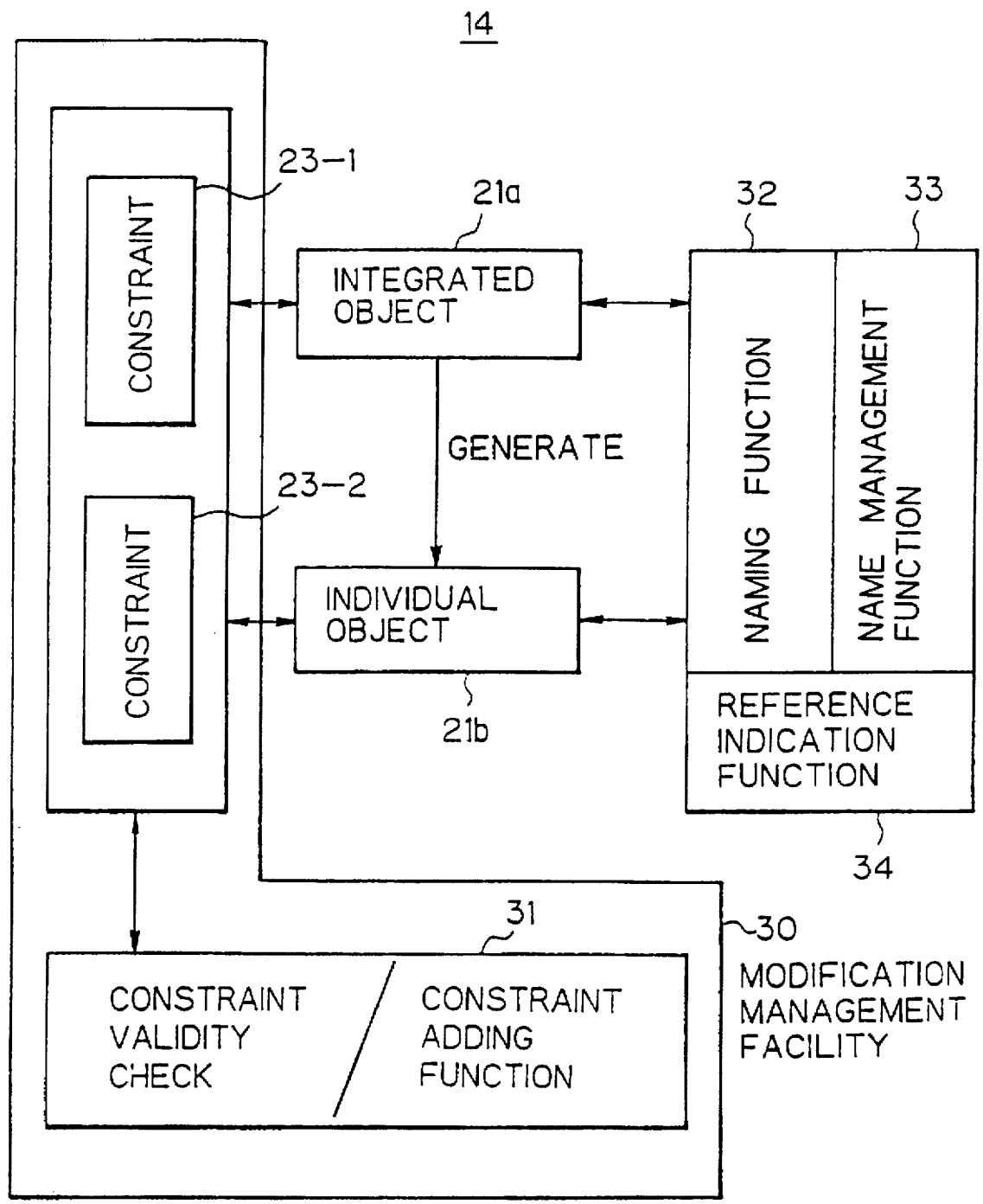
FIG. 3 is a view showing an example of the specific construction of the noun object management facility 14 shown in FIG. 1A.

FIG. 3 is a view showing an example of the specific construction of the noun object management facility 14 shown in FIG. 1A. The noun object management facility 14 shown in FIG. 1A, as shown in FIG. 3, has a naming function 32 which enables the user or the system to give any name to an individual object 21b, and has a name management function 33 which manages the names that are given. Using these names, it becomes possible to differentiate a specific individual object 21b from other objects. Further, it is possible to differentiate it from others by the reference indication function 34 indicating references for a specific individual object 21b.

The noun object management facility 14 has a modification management facility 30 which adds to the noun objects constraints 23-1 and 23-2 as adjectives for modifying the noun objects and manages them as objects. The modification management facility 30 has a constraint validity check/ constraint adding function 31 which judges the compatibility of the nature of the noun object to which the specified individual object 21b belongs and the constraint modifying it.

Using the constraint validity check/constraint addition function 31, the constraint on the integrated object 21a corresponding to a common noun is inherited and becomes the constraint of the individual object 21b of the proper noun belonging to it. It is also possible to add a valid constraint.

The above-mentioned reference indication function 34 is used when there is no name given by the naming function 32. For example, in FIG. 2B, the reference indication function 34 attaches an article such as "this" point, "that" point, or "the last" point. When making a point sequence by this, the "point" serving as the next starting point can be quickly specified.

In the above-mentioned constraint validity check function, the presence of a contradiction between the constraints 23-1 and 23-2 is investigated. The constraint 23-1 and the constraint 23-2 can be set independent of each other, but as mentioned earlier, the nature of the integrated object 21a is inherited as the nature of the individual object 21b as well, so there must not be any logical contradiction between the constraints 23-1 and 23-2. For example, if the constraint 23-1 is a "solid line" and the constraint 23-2 is a "broken line", the two do not match. This type of contradiction is discovered by the constraint validity check function and notified to the user.

Figure 4A:
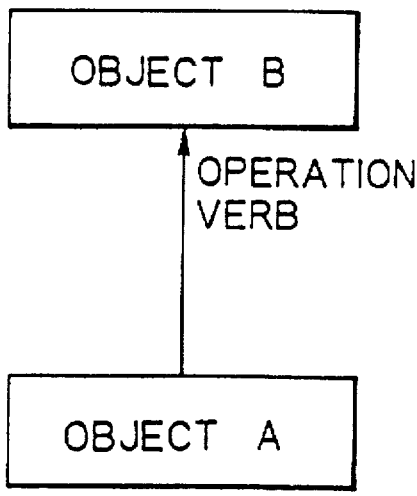
FIGS. 4A, 4B, and 4C are views showing three types of verbs forming verb objects.
Figure 4B:
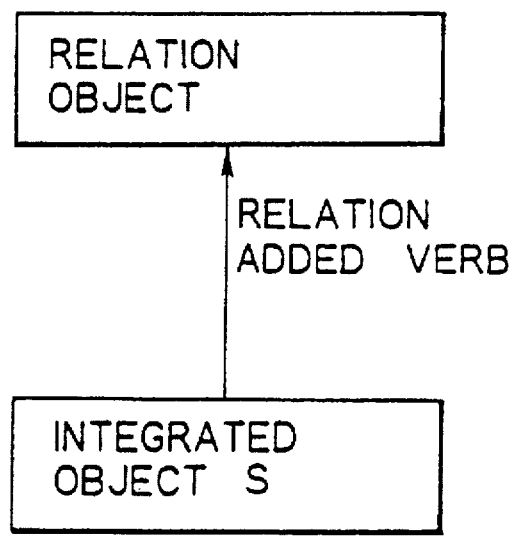
Figure 4C:
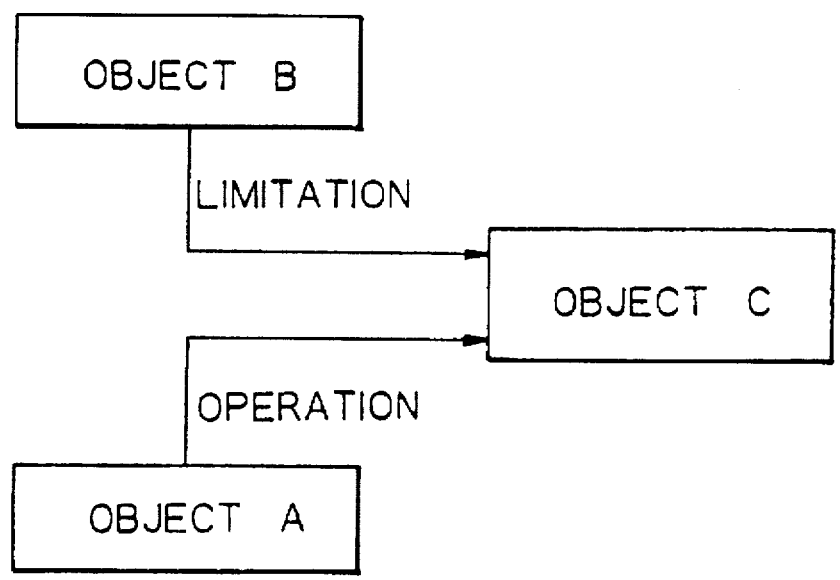

FIGS. 4A, 4B, and 4C are views showing three types of verbs forming verb objects. These figures show the three types of verbs, which are:

a) Operation verbs which perform operations for combining data and other constraints to a certain object so as to specify a noun object as the object to be processed (FIG. 4A), b) Relation added verbs which act on groups of individual objects constituting an integrated object so as to generate a noun object with a new relation (FIG. 4B), and c) Limited operation verbs which give specific constraints by noun objects combined with prepositions defining the nature of the constraint and performs an operation on the noun object to be processed so as to satisfy the limitation (FIG. 4C). These are constituted so as to be judged and processed in sentence units.

Specifically, the operation verbs shown in FIG. 4A are elements of functions for transforming an object A to an object B. In the example of FIG. 2A, the element creating the noun object ("point") from the noun object ("None") using the coordinate value data as the limitation corresponds to this.

The relation added verbs shown in FIG. 4B are elements of functions for generating a new object (relation object) by giving a certain relation to an integrated object S of a group of proper noun objects. In the example of FIG. 2A, the element which gives a connection condition of the point to the noun object (point sequence) of the successive group of points corresponds to this.

The limited operation verbs shown in FIG. 4C are elements of functions whereby an object B is given as a constraint when transforming the object A to the object C. In the example of FIG. 2A, when transforming a noun object showing the luminance attribute to be imparted to the point (luminance on the point) to a noun object showing the luminance attribute for a sequential group of points (luminance on the point sequence), the noun object specifying the sequential group of points (point sequence) becomes the constraint. This case corresponds to a limited operation verb.

Note that in FIG. 2A, the processing progressing from the bottom to the top of the left side column shows the process for drawing an outline of the pot of FIG. 2D, while the processing progressing from the bottom to the top of the right side column shows the process for designating the contrast of the pot. In this case, as the execution routine, the routine may be adopted where first the left side column steps are carried out, then the right side column steps are carried out. Alternatively, the left side column steps and the right side column steps may be carried out at the same time. Whatever the case, the right side column steps are never carried out before the left side column steps. The reason why is that the left side column specifies the entities of the graphic (pot), while the right side column designates their attributes.

Figure 5A:
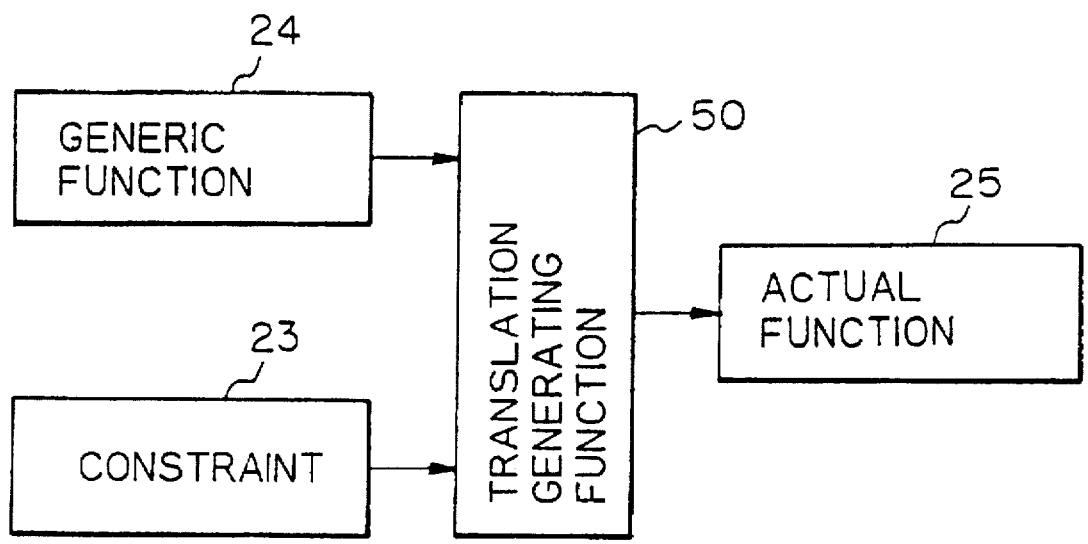
FIGS. 5A and 5B are views for explaining the relation between generic functions and actual functions according to the present invention.
Figure 5B:
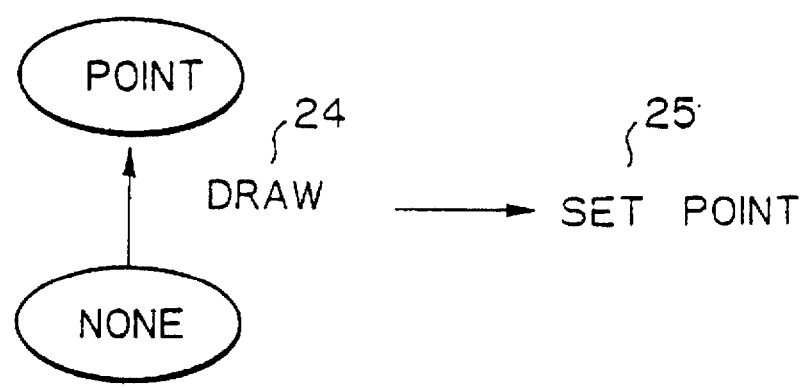

FIGS. 5A and 5B are views for explaining the relations between generic functions and actual functions according to the present invention. As shown in FIG. 1D, a verb object comes in two types: a generic function 24 and an actual function 25. That is, a verb object comes in the form of an actual function 25 which can perform the processing for actually executing a noun object to be processed and a generic function 24 which is transformed into an actual function 25 by addition of constraints 23. The control for transformation from generic functions to actual functions is performed by the verb object control facility 15 shown in FIG. 1A. In this case, the verb object control facility 15 has the function of transforming to a constraint, as the status name, the name of the noun object upon which processing has finished being executed as the constraint for the verb object corresponding to the generic function (23C in FIG. 6) and gives an actual function which can be executed based on that constraint.

Referring now to FIG. 5A, the verb object is specified by provision of a translation generating function which generates an actual function 25 from a generic function 24 and a constraint 23, so that the user need only be aware of the generic function 24. The user no longer has to remember the actual function 25 corresponding to the actual processing procedure and so it is possible to improve the user-friendliness.

For example, the generic function named "send(X)" is "send(X) to D" and literally sends X to D. It is possible to add a constraint as the means for sending this.

As the constraint for the generic verb object, positive use may be made of the fact that the noun object now being executed shows the current state of the system. For example, as shown in FIG. 5B, when the name of the noun object showing the current state of execution of the system is "None", by making this the constraint, the generic function ("draw") 24 is transformed to the actual function ("set point") 25.

For example, in the object network shown in FIG. 2A, the "set point", "list points", and "generate curve" shown in the left side column of the figure are all actual functions, but these may be expressed by a single generic function ("draw"). The user does not have to remember the actual functions "set point", "list points", and "generate curve", but can treat them all as "draw". Which of "set point", "list points", and "generate curve" "draw" means is automatically determined by adding the current system execution state as a constraint.

That is, the generic function ("draw")+constraint ("None")→actual function ("set point"), and generic function ("draw")+constraint ("point")→actual function ("list points").

FIG. 6 is a view for explaining the management of the execution of a verb object in an embodiment of the present invention. The function execution management facility 60 shown in the figure, roughly speaking, has a means for adding constraints for the start, duration, and end of the operation when causing a verb object to act as a function and for checking the validity at different points of time. Further, it defines an actual constraint for a generic function for which constraints were given as generic conditions, thereby sequentially checking the validity and generating a transformation procedure for transformation in the process of transformation to actual functions.

Explained in more detail, in FIG. 6, when specifically executing a verb object, the start constraint 23a, the duration constraint 23b, and the end constraint 23c are added and these are considered. When there is a request for operation based on designation of the name of a verb corresponding to a generic function, the function execution management facility 60 adds a start constraint 23a, combines it with other constraints, checks the validity, and transforms the function to an actual function. The routine then shifts to the execution 61 of the actual function. Even during operation, the duration constraint 23b is added sequentially and helps the function of checking the validity of the system operation and the estimation function. Further, after the end of the execution, the end constraint 23c is added and assists the validity check function.

For example, in the case of drawing an arc in FIG. 2C, the coordinate values of at least three points have to be determined. If only the coordinate values of two points are determined, a contradiction is caused in the execution of the function drawing the arc. In the present embodiment, however, the validity is checked in advance by the validity check function in the function execution management facility 60 and therefore it is possible to avoid a contradiction. By this facility, it is possible to automatically activate the function requesting the input of the coordinate values of the third point from the user when necessary.

Figure 7A:
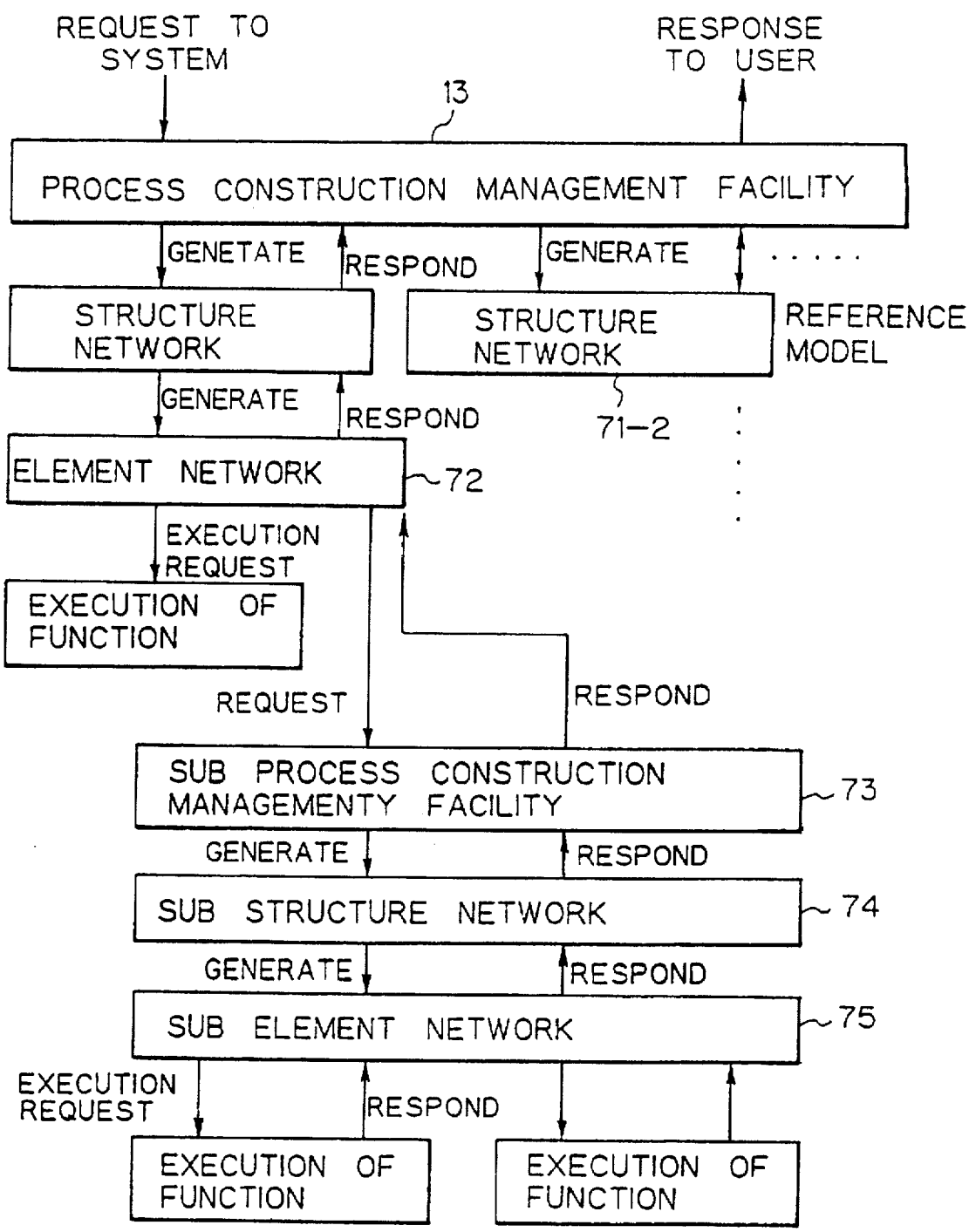
FIGS. 7A and 7B are views for explaining the hierarchy for carrying out concurrent processes.
Figure 7B:
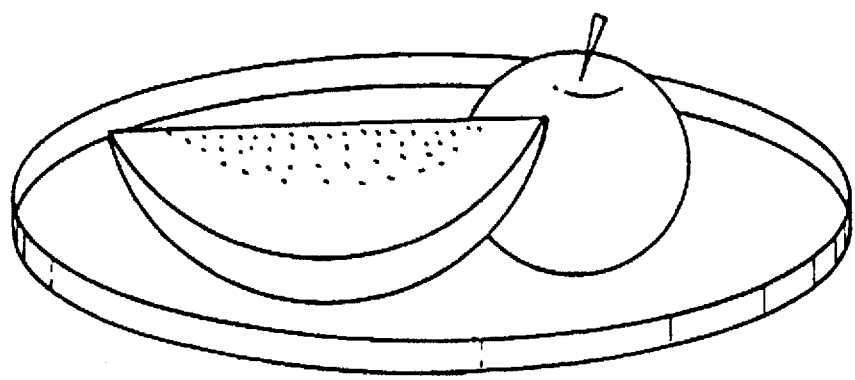

FIGS. 7A and 7B are views for explaining the hierarchy for carrying out concurrent processes. In FIG. 2D, a pot, which is an extremely simple graphic, is drawn. However, in a graphic system, for example, the graphic to be drawn is more complex. For example, the graphic shown in FIG. 7B is a combination of a watermelon, apple, and dish. The front and rear constraints among them are also designated. In actuality, it is necessary to create a more complex graphic on the "canvas" of the display.

To create such a complex graphic, it is necessary to introduce the idea of concurrent processing to the process construction management facility of FIG. 1A. This is illustrated in FIG. 7A.

Generally speaking, there is a process construction management facility 13 which creates individual objects by execution of specific actual functions from the state of integrated objects corresponding to common nouns in an object network showing its construction as a reference model and which expresses the relations between elements, thereby building an element network 72 and, further, in the element network, generates and manages the object network so that actual processing is performed by the request for execution for the individual objects. Note that the element network 72 corresponds to the drawing of the watermelon, apple, and dish of FIG. 7B.

The verb objects of the object network having portions defining the construction are actuated, the corresponding element network is created, the data relating to the element object is added as a constraint, and the process is executed based on the requests from inside and outside the system for the verb objects and the limitations concerning the processing order and based on the indication control of the process construction management facility.

The process construction management facility 13 generates a new structure network based on the structure network (71-1, 71-2 ...) used as the reference model, modifies and revises the constraints of the object network used as the reference model in accordance with requests from other systems, defines the constraints of the newly generated object network, and prepares to receive from the other systems requests to the element network based on the processing routine to be performed by the structure network completed as a result, thereby assigns the right of control, receives the fact of the completion of the processing as a result, and erases the structure network. The operation simultaneously means the completion of the element network. Further, there is a means for control which displays the results of the processing to other systems.

In this case, there is a function execution management facility 60 which makes pairs of requests and responses, such as the request for processing for generation of a structure network from the process construction management facility 13 and the resultant response or a request for generation and processing of an element network from a structure network and the response to the same, and performs a service of repeating the requests to the lower layer network and the response to the higher layer network by execution of the functions corresponding to the requests.

The function execution management facility performs the transformation from generic functions to actual functions and the indication control of the checking of validity in execution. If the result is that it is incomplete, a new pair of requests and responses is conversely issued to a higher layer network to complete the same. If complete, it is executed and processing is performed for the response to the higher layer network.

FIG. 7A will be explained in further detail.

In general, faced with diverse requests made from a user, a system divides its functions into basic modules at suitable levels, combines them in tandem or concurrently in the necessary order, and builds these up so as to perform the processing. Due to the method of processing for the requests and the continuous generation of user requests, the system requires a hierarchical structure of processing and concurrent processing at the different layers.

In a system constructed by the present invention, this processing can be considered to be movement on an object network comprised of noun objects and verb objects. In the object network, when a plurality of processes are processed concurrently, control over movement on the object network becomes necessary. Below, an explanation will be made of the construction of the object network and the concurrent processes.

If a unit of independent control received is considered one process, a system in which progression of a plurality of processes is a concurrent system. In particular, when a job consisting of a plurality of processes assembled into one package is executed, there is an interaction among processes when executing a certain operation or when accessing the same resource and therefore a need for defining the order etc. becomes necessary. To realize concurrent processes on an object network, it becomes necessary to control the movement among nodes. Therefore, a hierarchy is made in the system as shown in FIG. 7A and the process is controlled by the process construction management facility 13.

There are basically the following four layers:
(1) Process construction layer: Receives request for generation of integrated object and decides on process for generating individual objects.
(2) Structure network layer: Displays object network as reference model and controls order of processing.
(3) Element network layer: Generates individual objects
(4) Function execution layer: Executes functions in actuality.

Control is transferred among these layers by pairs of requests and responses.

The process construction management facility 13 receives the request from the external user to the system, decides on the order of processing of the objects, and generates the structure networks 71-1 and 71-2 of the next layer. In the structure network 71-1, the element network 72 is generated in accordance with the processing routine decided by the process construction management facility 13. The network itself is considered an object as well and a request may be made to the subprocess construction management facility 73 for control of a more detailed processing routine.

In the subprocess construction management facility 73 receiving the request, a request is made for processing for generation to the substructure network 74 and in the substructure network 74, a request is made for processing for generation to the subrequest network. Responses from the lower layers are received successively.

Figure 8:
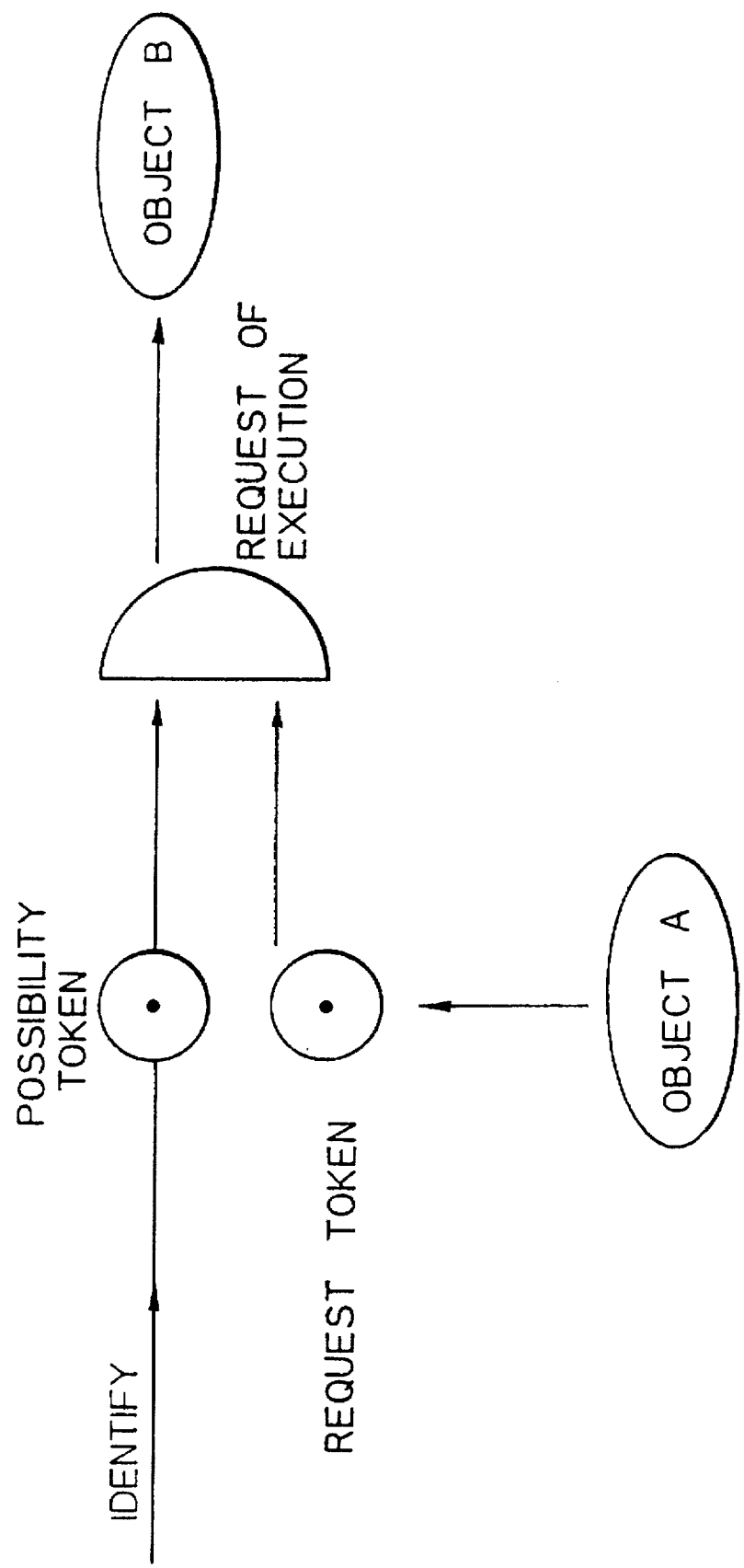
FIG. 8 is a view for explaining a token control method in a Petri network.

FIG. 8 is a view for explaining a token control method in a Petri network. It is possible to use the token control method in a Petri network shown in FIG. 8 as a more specific example of the execution routine for realizing concurrent processes.

If the token control method of FIG. 8 is used, the process management facility 13 of FIG. 7A performs control for concurrent processing of processes wherein it defines the constraints for the processing routine by the orientation of the verb objects in the object network formed, simultaneously judges if the verb object with a possibility token showing that the object can be next executed can be processed concurrently, receives the request for actuation for the verb object, and performs the actual execution.

In FIG. 8, if for example the object A is made the luminance data value for a point (luminance data value), by identifying the point, a possibility token is generated. By matching this with the execution token from the object A, the execution request is issued.

The steps of the right side column of FIG. 2A, already explained with reference to FIG. 2A, will not proceed so long as the steps of the left side column in FIG. 2A do not proceed ahead. This logic can be simply expressed by the Petri network of FIG. 8.

Figure 9:
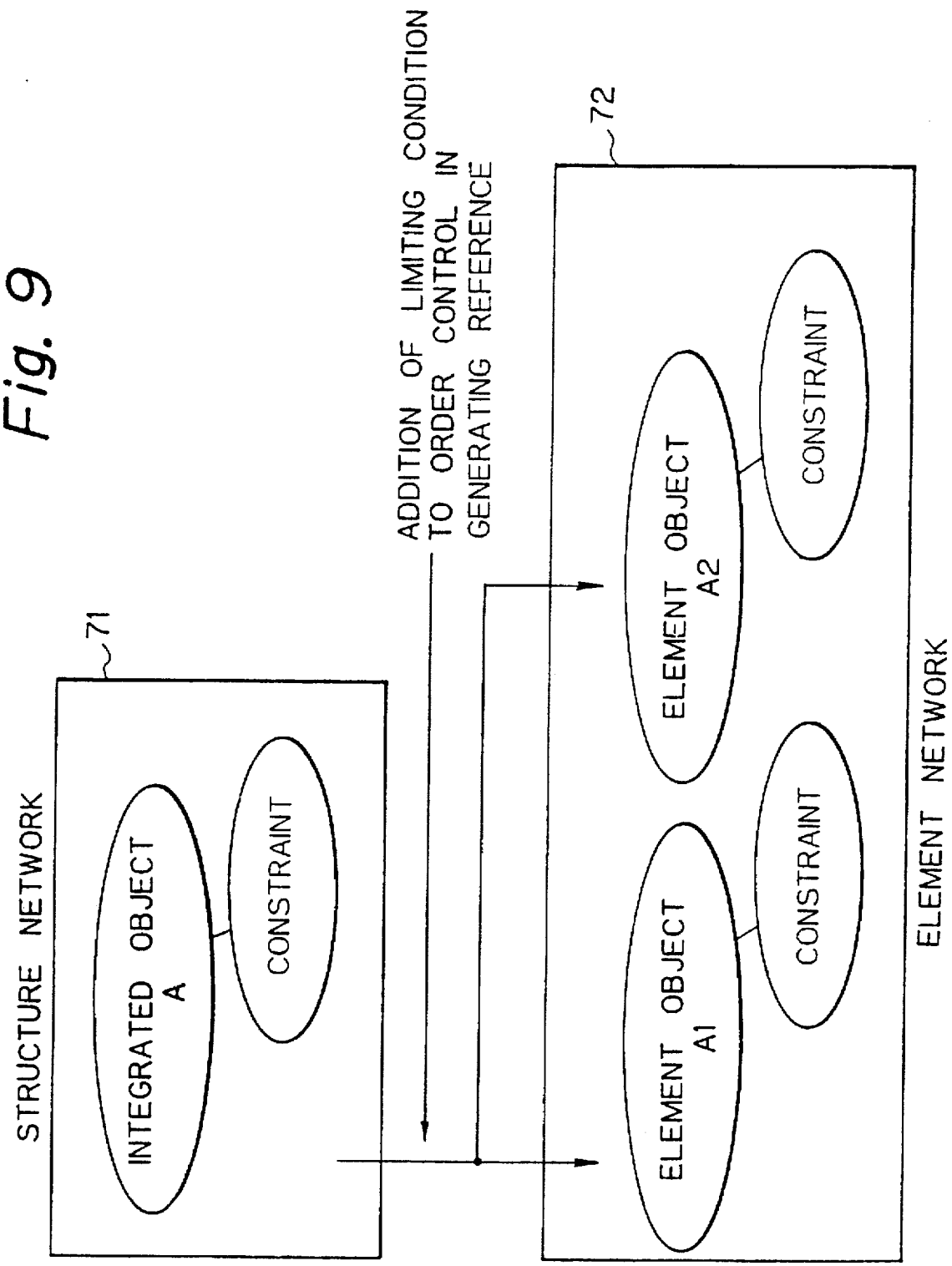
FIG. 9 is a view showing the structure network 71 and element network 72 of FIG. 7A.

FIG. 9 is a view showing the structure network 71 and element network 72 of FIG. 7A and shows an example of the generation of an element object.

A verb object at the structure network 71 having a portion defining the structure is actuated and the element network 72 is created. Data relating to the element object is added as constraints. The constraints relating to the control of the processing routine at the time of generation of the reference can be modified or revised in accordance with a request from another system. The element objects A1 and A2 have different limitations of the processing routine. "Other systems" refers to other systems which work simultaneously under concurrent processes.

Note that the element objects A1 and A2 in FIG. 9 correspond to the drawing of the watermelon and apple of FIG. 7B, for example, respectively.

Examples of the application to a specific field of application are not limited to graphic systems for drawing color graphics. The present invention may also be similarly applied to various types of systems for operating to change the state inside the system by event drive or data drive. The following detailed explanation, however, is made using as an example a color graphic system similar to that described above.

First, an explanation will be made of the syntax and meaning of the color graphic system description language corresponding to the system description 10 using the field description language shown in FIG. 1A.

The graphic system description language according to the present embodiment has a network describer which describes the object networks, a function describer which describes the functions, and a window describer which defines the windows for the input-output interface with the operator. The syntax is the free grammar of the context and can be described by the Backus-Naur Form (BNF) notation. The basic parts of speech relating to the syntax are given in the following (1) to (6):

(1) Characters The characters used in the graphic system description language include capital letters, small letters, and numerals. The capital letters are used for description of the definitions and identifiers, while the small letters are used for identifiers. The numerals are used for expressing numerical values and are used in the identifiers. The capital letters, small letters, and numerals are expressed by the BNF notation.

<Small letters>::=a|b|c|d|e|f| ... |x|y|z|_

<Capital letters>::=A|B|C|D|E|F| ... |X|Y|Z|_

<Numerals>::=1|2|3|4|5|6|7|8|9|0

(2) Numerical Values

The numerical values are used to express coordinates, magnitudes, etc. If expressed by the BNF notation, they become <Numerical values>::=<Numerical values><Numericals>|<Numerals>.

(3) Identifiers

These are used to express names such as names of networks and names of windows. As a rule with identifiers, the first character must be a letter of the alphabet. The identifiers come in three types: small letters and numerals alone, capital letters and numerals alone, and capital letters, small letters, and numerals mixed together.

<Small letters and numerals>::=<Small letters>|<Numerals>

<Capital letters and numerals>::=<Capital letters>|<Numerals>

<Letters and numerals>::=<Small letters>|<Capital letters>|<Numerals>

<Small letter identifiers>::=<Small letters identifiers><Small letters and numerals>|<Small letters>

<Capital letter identifiers>::=<Capital letters identifiers><Small letters and numerals>|<Capital letters>

<Identifiers>::=<Capital letter identifiers>

<Capital letters and numerals>|<Small letters>|<Capital letters>

(4) Network Describers

The network describers describe the object networks by network definitions (DEF-NET). The syntax of the network definitions is as follows:

DEF-NET[<Net name>] {<Network definition>}

<Network definition>::=ENTITY [<Entity net name>]
{<Entity list>;}<Attribute definition>

<Attribute definition>::=<Attribute definition>
ATTRIBUTE [<Attribute net name>]
{<Attribute list>;}
|ATTRIBUTE [<Attribute net name>]
{<Attribute list>;}

<Entity list>::=<Entity object>;<Entity list>
|<Entity object>;

<Attribute list>::=<Attribute object>;
<Attribute list>
|<Attribute object>;

<Entity object>::=<Data class name>:<Generic function list>

<Attribute object>::=<Attribute name>:<Generic function list>

<Generic function list>::=<Generic function list>,
<Generic function name>→
<Direction>
|<Generic function name>→<Direction>

<Direction>::=UP|DOWN|END
|<Data class name>!<Entity net name>@<Net name>
|<Attribute name>!<Attribute net name>@<Net name>

<Net name>::=<Identifier>

<Entity net name>::=<Identifier>

<Attribute net name>::=<Identifier>

<Data class name>::=<Capital letter identifier>

<Attribute net name>::=<Capital letter identifier>

<Generic function name>::=<Capital letter identifier>

If the meaning of the network definitions is expressed by natural language in an itemized fashion, the following results:

(a) The definitions define the object networks.

(b) The object networks are comprised of single entity networks and multiple attribute networks.

(c) The entity networks are comprised of data classes and lists of generic functions corresponding to the same.

(d) The attribute networks are comprised of names of attributes of data classes and lists of generic functions corresponding to the same.

(e) The lists of generic functions are comprised of lists of generic functions connected by "→" to the destinations after execution of the functions.

(f) The destinations are "UP", meaning to move to the one higher data class, "DOWN", meaning to move to the one lower data class, and "END", meaning to end, and designate the absolute position in the network. The format of the designation is the data name (name of attribute of data) !name of entity network (name of attribute network)@name of network.

(5) Function Describers

The function describers describe generic functions by generic function definitions (DEF-GENERIC-FUNC) and describe actual functions by actual function definitions (DEF-ACTUAL-FUNC).

(5-1) The syntax of the generic function definitions is indicated by BNF notation.

DEF-GENERIC-FUNC [<Name of generic functions>] {<List of actual functions>;}

<List of actual functions>::=<List of actual functions>;<Limited actual function>|<Limited actual function>

<Limited actual function>::=<Constraint>:<Name of actual function>

<Constraint>::<Constraint><Logical operator><Expression>|<Expression>

<Expression>::=<System variable><Relational operator><Value>

<Logical operator>::=&&| ||

<Relational operator>::= ==|!=|<|>|<=|>=

<System variable>::=CURRENT-NET|CURRENT-PART|CURRENT-STEP|DIRECTION

<Name of generic function>::<Capital letter identifier>

If the meaning of the generic function definitions is expressed in an itemized fashion, the following results:

(a) The generic function definitions define the generic functions.

(b) The generic functions are defined so that the corresponding actual functions are selected when the constraints are true.

(c) The constraints express equations, comprised of system variables and their values connected by relational operators, connected by logical operators.

(d) In the system variables, CURRENT-NET expresses the current network, CURRENT-PART expresses the selected entity and attribute network, CURRENT-STEP expresses the position on the network, and DIRECTION expresses the direction of progression on the network.

(5-2) The syntax of the actual function definitions is expressed by BNF notation.

DEF-ACTUAL-FUNC [<Name of actual function>] :<Name of output class>,

<List of names of input classes>]

{/* C language program */}

<Name of output class>::=<Name of data class>

<List of names of input classes>::=<List of names of input classes>/<Input class>|<Input class>

<Input class>::=<Name of data class>:<Request format>

<Request format>::=ALL|CURRENT|<Name of actual function>

<Name of actual function>::=<Small letter identifier>

<Name of data class>::=<Capital letter identifier>

If the meanings of the actual function definitions are expressed in an itemized fashion, the result is as follows:

(a) The actual function definitions define the actual functions.

(b) The actual functions define the output class as the result of the functions and the list of input classes as the argument of the functions.

(c) The list of input classes designates the input class and the request format of the class. The request format includes "ALL", requesting all the data of the class, "CURRENT", requesting the data of the class executed one time before, and <Name of actual function>, requesting execution of the actual function generating the data of the class.

(6) Window Describers

The window describers describe the data window classes by the window class definitions (DEF-WIN-CLASS), describe the data windows by the data window definitions (DEF-DATA-WIN), and define the selection windows by the selection window definitions (DEF-SELECT-WIN).

The data windows are windows which are generated as objects of data window classes, can display or erase noun objects designated, and can input coordinate data designated by a mouse etc. The selection windows are windows for requesting judgement from a user in cases where a user judgement is required when the system is processing.

(6-1) The syntax of the window class definitions is expressed by BNF notation.

DEF-WIN-CLASS [<Name of window class>:<Bar switch>, <Width of display region>, <Height of display region>]

<Name of window class>::=<Identifier>

<Bar switch>::=ON|OFF

<Width of display region>::=<Numerical value>

<Height of display region>::=<Numerical value>

The meaning is as follows:

(a) The data window class is defined.

(b) The data window class has a switch designating if the data window generated has a scroll bar or not and designates the magnitude of the length and breadth of the display region (canvass) of the virtual display.

(6-2) The syntax of the data window definitions is expressed in BNF notation.

DEF-DATA-WIN [<Name of data window>:<Name of window class>, <Initial value x>, <Initial value y>, <Initial width>, <Initial height>]

<Name of data window>::=<Identifier>

<Initial value x>::=<Numerical value>

<Initial value y>::=<Numerical value>

<Initial width>::=<Numerical value>

<Initial height>::=<Numerical value>

The meaning is as follows:

(a) The data window is defined as an interface of the window class.

(b) The initial display position of the data window and the magnitude of its length and breadth are defined.

(6-3) The syntax of the selection window definitions is expressed by BNF notation.

DEF-SELECT-WIN [<Name of selection window>] {<List of selection windows>}

<Name of selection window>::=<Identifier>

<List of selection windows>::=<List of selection windows>;

|<Definition of selection window>

<Definition of selection window>::=menu(<List of display entities>)

|key(<Message>)

<List of display entities>::=<List of display entities>/<Display entities>

|<Display entities>

<Display entity>::=<Capital letters & numerals>
<Message>::=<Capital letters & numerals>
The meaning is as follows:
(a) The selection window is defined.
(b) The selection window can designate the menu type or the key type.
(c) In the case of the menu type, the displayed item is described.
(d) In the case of the key type, the message is described.

Figure 10:
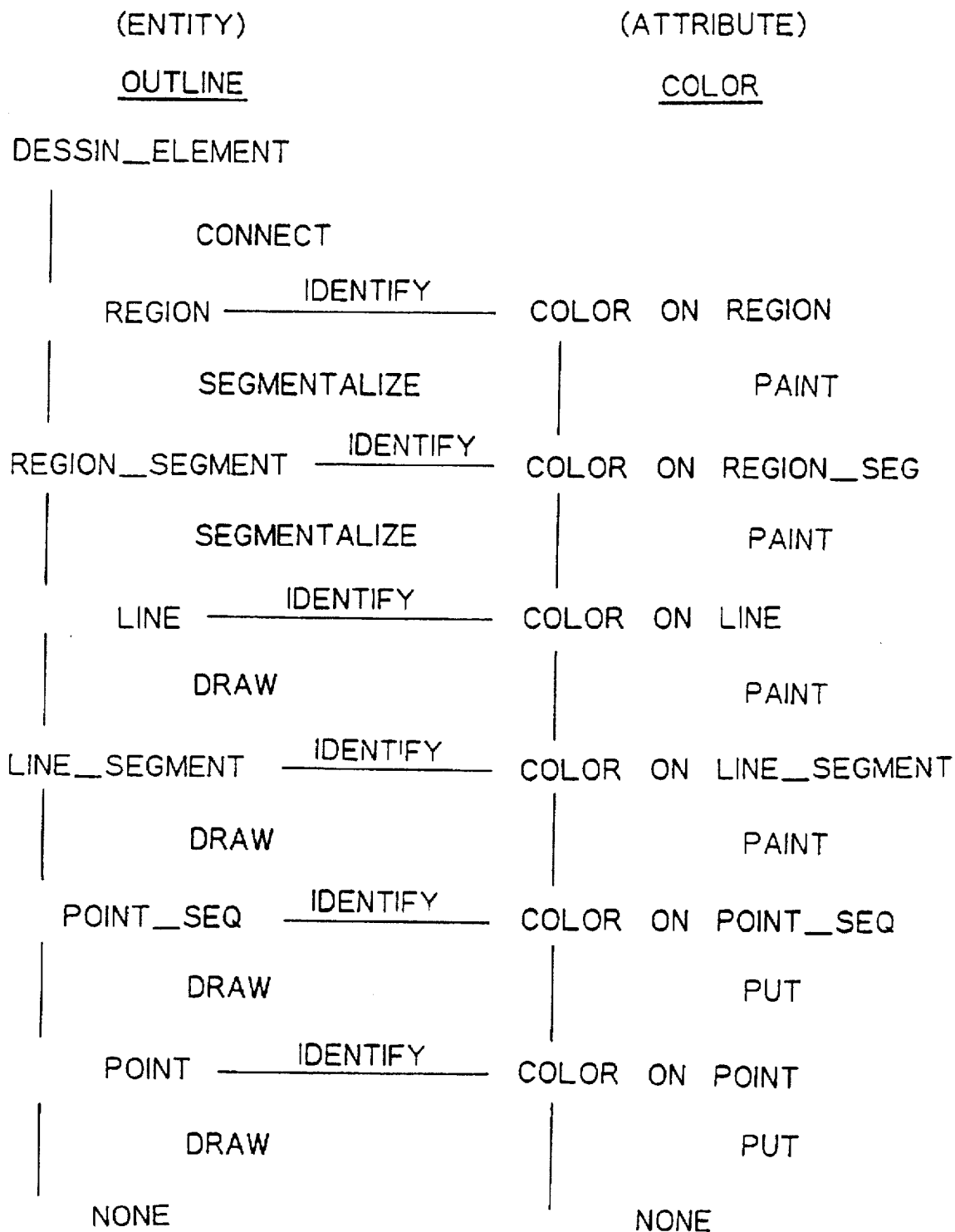
FIG. 10 is a view showing an example of a color graphic object network according to an embodiment of the present invention.

FIG. 10 is a view showing an example of a color graphic image object network according to an embodiment of the present invention. The figure corresponds to FIG. 2A previously explained. The component of luminance shown in the right side column of FIG. 2A, however, is superposed in the component of color in the right side column of FIG. 10, covering a color graphic.

Assume a graphic system which operates in accordance with the graphic image drawing object network shown in FIG. 10 is to be built. In the object network, the graphic data is divided into a plurality of stages of nodes, such as points, lines, and regions. As the verb objects for transforming certain data class data to other data class data, there are several functions such as "create point", "create line", and "create region". These functions are expressed by generic functions such as DRAW, SEGMENTALIZE, etc. Note that, referring to FIG. 2C, the above "points" correspond to the small circles in the figure, the "lines" correspond to the lines connecting the small circles, and the "regions" correspond to the portion enclosed by the left and right pair of S-shaped lines.

In a well known CAD or CAM system, everything is constructed by a detailed and large program, but the present invention achieves the desired objective autonomously by just following the steps shown in FIG. 10 in accordance with a message, i.e., a programless system is realized. FIG. 10 will be explained in detail below. Note that the operation in FIG. 10 corresponds to the operation for drawing one of the watermelon, apple, and dish in FIG. 7B, for example.

The chromaticity information, important in the drawing of the graphic image, is defined as an attribute of the graphic data. An object network is defined for the attributes as well.

The object network shown in FIG. 10 becomes as follows if defined by the description grammar of the network definitions mentioned above:

```
DEF-NET [Painting] {
    ENTITY [Outline] {
        NONE:            DRAW -> UP;
        POINT:           DRAW -> UP;
        POINT-SEQ:       DRAW -> UP;
        LINE-SEG:        DRAW -> UP;
        LINE:            SEGMENTALIZE -> UP, DRAW ->
    POINT:
        REGION-SEG:      SEGMENTALIZE -> UP;
        REGION:          DRAW -> POINT, PUT ->
    POINT-COLOR! Color;
    }
        ATTRIBUTE [Color] {
            NONE:              PUT -> UP;
            POINT-COLOR:       PUT -> UP;
            POINT-SEQ-COLOR:   PAINT -> UP;
            LINE-SEG-COLOR:    PAINT -> UP;
            LINE-COLOR:        PAINT -> UP;
            REGION-SEG-COLOR:  PAINT -> UP;
            REGION-COLOR:      PUT -> POINT-COLOR;
        }
}
```

The network name of this drawing use object network is "Painting". "Outline" is defined as the entity network, while "color" is defined as the attribute network. In this object network, a plurality of functions are defined in LINE and REGION. In the case of LINE, by defining DRAW→POINT, the generic function DRAW is executed, then the processing shifts to POINT.

By doing this, it is possible to describe a loop structure and possible to draw a plurality of lines. To escape from this loop, SEGMENTALIZE is selected at LINE.

In REGION, DRAW→POINT and PUT→POINT-COLOR!Color are defined. DRAW→POINT expresses to execute DRAW, then move to POINT and can draw a plurality of outlines. PUT→POINT-COLOR!Color indicates to execute PUT, then move to POINT-COLOR of the "Color" network. By this, it is possible to directly move to the chromaticity information generation network after finishing the creation of the outlines.

The drawing function of the content of the verb object is defined as follows, for example, in terms of generic functions and actual functions:

(1) Definition of Generic Functions
DEF-GENERIC-FUNC [DRAW] }
  CURRENT-NET== "Painting" && CURRENT-PART== "Outline" && CURRENT-STEP== "NONE" && DIRECTION== "UP": set-pp;
  CURRENT-NET== "Painting" && CURRENT-PART== "Outline" && CURRENT-STEP== "POINT" && DIRECTION== "UP": create-ps;
  CURRENT-NET== "Painting" && CURRENT-PART== "Outline" && CURRENT-STEP== "POINT-SEQ" && DIRECTION == "UP": create-ls;
  CURRENT-NET== "Painting" && CURRENT-PART== "Outline" && CURRENT-STEP== "LEG-SEG" && DIRECTION== "UP": create-l;
  CURRENT-NET== "Painting" && CURRENT-PART== "Outline" && CURRENT-STEP== "LINE" && DIRECTION== "POINT": set-pp;
  CURRENT-NET== "Painting" && CURRENT-PART== "Outline" && CURRENT-STEP== "REGION" && DIRECTION== "POINT": set-pp;

A generic function is defined by describing conditions of transformation to actual functions in accordance with the grammar of the above-mentioned system description. Here, an example of the definition is shown taking as an example the generic function DRAW, but SEGMENTALIZE, CONNECT, PUT, PAINT, etc. may be similarly defined.

DRAW is a generic function for creating outlines and is transformed to an actual function by giving the constraints corresponding to one of the actual functions, such as "set-pp", "create-ps", "create-ls", "create-l". For example, as the constraints, if the current network CURRENT-NET is "Painting", the selected entity network CURRENT-PART is "Outline", the network position CURRENT-STEP is "NONE", and the direction of progression on the network DIRECTION is "UP", and the generic function DRAW is transformed to the actual function "set-up" which sets the coordinate data of a point.

(2) Definition of Actual Functions
The actual functions in the graphic system are defined as follows:
DEF-ACTUAL-FUNC [set-pp: POINT, COORDINATES; draw1]
DEF-ACTUAL-FUNC [create-es: LINE-SEG, POINT-SEQ: current]
DEF-ACTUAL-FUNC [create-l: LINE, LINE-SEG: current]
DEF-ACTUAL-FUNC [create-rs: REGION-SEG, LINE: current]

DEF-ACTUAL-FUNC [create-r: REGION, REGION-SEG: current]

DEF-ACTUAL-FUNC [create-de: REGION, DESSIN-ELEMENT: current]

DEF-ACTUAL-FUNC [put-color-pp: POINT, COORDINATES; draw1/1-diagram/c-diagram]

DEF-ACTUAL-FUNC [put-color-ps: POINT-SEQ, POINT: current]

DEF-ACTUAL-FUNC [paint-color-ls: LINE-SEG, POINT-SEQ: current]

DEF-ACTUAL-FUNC [paint-color-l: LINE, LINE-SEG: current]

DEF-ACTUAL-FUNC [paint-color-rs: REGION-SEG, LINE: current]

DEF-ACTUAL-FUNC [paint-color-r: REGION, REGION-SEG: current]

Here, a supplementary explanation will be made of the graphic data class COORDINATES. COORDINATES is a class expressing the coordinates and is the highest class among the graphic data classes. Therefore, this class is never written in the output classes of actual functions. When written in an input class, other graphic data classes have the <Request Format> written. Only COORDINATES designates the name of the data window requesting the input of the coordinate data. It can designate a plurality of names of windows requesting the coordinate data.

In designating the input data class of the actual function "put-color-pp", the data window "draw", "1-diagram", and "c-diagram" are designated as the names of the request windows for COORDINATE. This enables input of coordinate data from the three data windows concurrently.

In this embodiment, the actual processing of the actual function is performed using the C programming language. Specific details of the processing are as follows:

set-pp: Set primary points create-ps: Create point sequence create-ls: Create line segment create-l: Create line create-rs: Create region segment create-r: Create region create-de: Create dessin element put-color-pp: Put chromaticity information in primary points put-color-ps: Put chromaticity information in point sequence paint-color-ls: Paint chromaticity on line segment paint-color-l: Paint chromaticity on line paint-color-rs: Paint chromaticity on region segment paint-color-r: Paint chromaticity on region In addition, the window relations are defined and the graphic system described.

This system description using such definitions is transformed into execution format data by the translator 11 shown in FIG. 1A.

Figure 11:
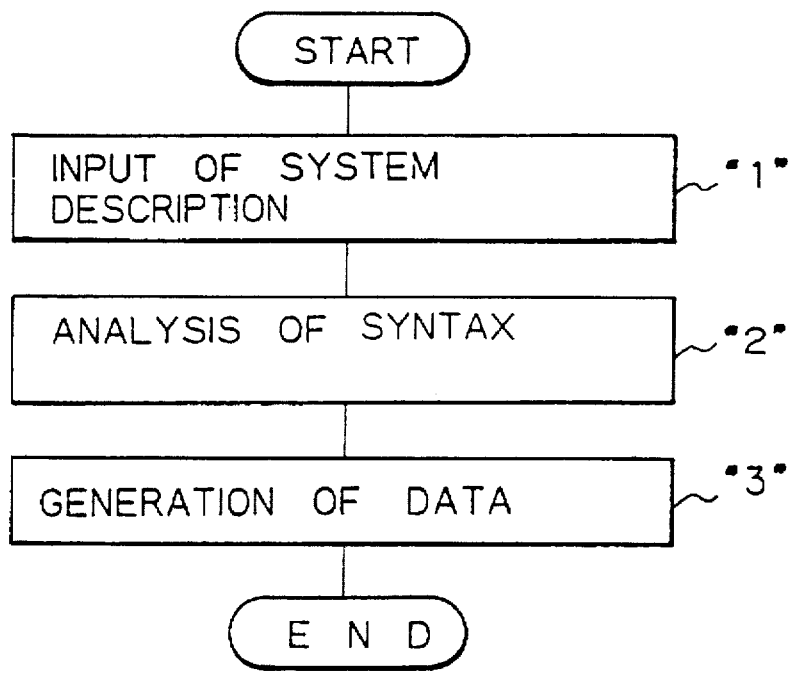
FIG. 11 is a flow chart of the operation of a translator (11 in FIG. 1A) used in the operation of FIG. 10.

FIG. 11 is a flow chart of the operation of the translator (11 in FIG. 1A) used in the operation of FIG. 10, wherein the following processing is performed:

[1] The system description (source program) is input.

[2] The source program is analyzed in syntax in accordance with the grammar of the system description language and the necessary information is organized in the data base.

[3] The data to be given to the execution system (run time system) 12 is generated from the data base.

However, the flow chart of FIG. 11 itself shows the general operation used in compilers, etc.

Figure 12:
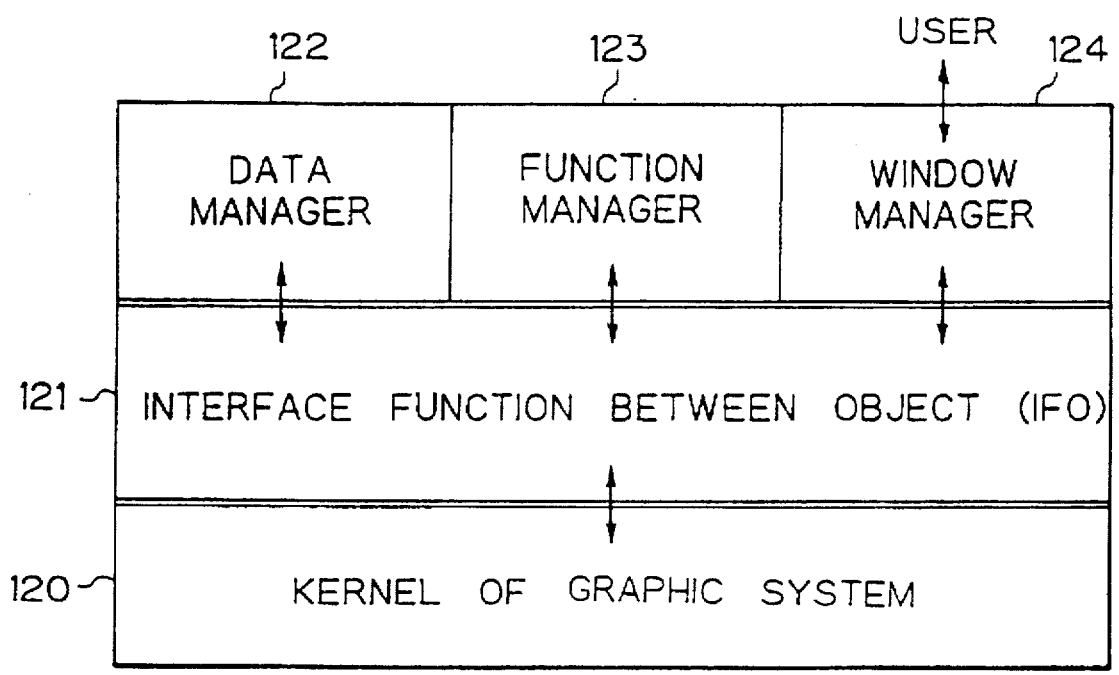
FIG. 12 is a view showing an example of the structure of an execution system (12 in FIG. 1A) for performing the operation of FIG. 10.

FIG. 12 is a view showing an example of the structure of an execution system (12 in FIG. 1A) for performing the operation of FIG. 10. In FIG. 12, 120 is a graphic system kernel, 121 is an interface function between objects (IFO), 122 is a data manager, 123 is a function manager, and 124 is a window manager.

The graphic system kernel 120 exists at the center of the execution system 12 and performs the following processing based on the data from the translator 11:

(1) Recognition of State of Data on Object Network

The drawing process is recognized and the function to be executed next is selected.

(2) Analysis of Events

The events sent from the windows are judged and the procedure inside the system corresponding to the results is called.

(3) Request for Execution of Function

Constraints are added to a generic function and the execution of a function is requested to the object interface 121.

The object interface 121 interfaces between the graphic system kernel 120 and the managers (122, 123, 124) managing the data, functions, and windows by standard protocol of the request-response format. By providing the standard protocol, it becomes possible to customize the language without modifying the graphic system kernel 120.

The protocol of the object interface 121 is divided into three parts: one each for the data manager 122, the function manager 123, and the window manager 124.

Protocols relating to reading and writing of data, modification, erasure, and other data operations are prepared for the data manager 122. For the function manager 123, there are protocols relating to the transformation from generic functions to actual functions, preparation of data required for execution of actual functions, and requests for execution of actual functions. For the window manager 124, protocols are prepared for data windows, selection windows, message windows, and operation windows.

To realize these protocols, the object interface 121 has a kernel interface at the kernel 120 side and a function server, data server, and window server at the manager (122, 123, and 124) side.

The kernel interface is the interface between the graphic system kernel 120 and internal servers. The kernel interface not only performs the role of an interface, but also analyzes the request from the kernel 120, requests processing to servers which can satisfy the request based on the results of the analysis, and proceeds with the processing.

The above-mentioned function server adds the system status at that time in accordance with the request for actuation of a function using the name of the generic function requested and executes the actual function to be actuated at that time. The data server registers, reads out, corrects, and erases noun objects for each class. It further has the function of referring to the noun objects by pronouns. The above-mentioned window server performs input-output processing, such as drawing and input, in the registered windows through the window manager 124.

Actual data, functions, and windows are managed in one package by the respectively corresponding managers (122, 123, and 124). The data manager 122 performs management of the graphic data. The function manager 123 performs management of the execution of functions. The window manager 124 performs management of the windows and drawing of objects in the windows. These managers are customized by generally constructed systems, but the protocols are not changed, so can be customized without having any other effects.

Figure 13A:
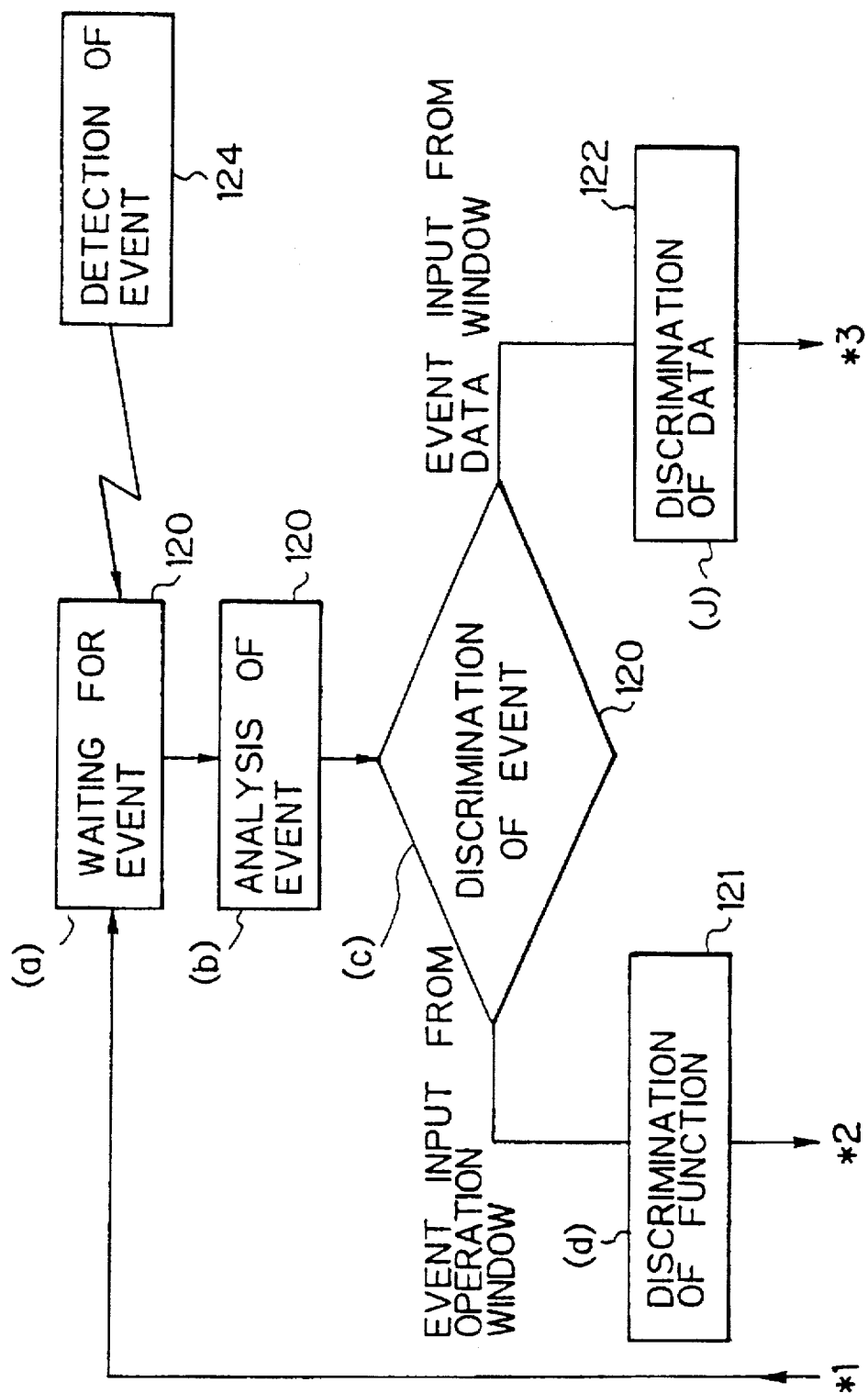

FIGS. 13A and 13B are flow charts showing an example of the operation of the execution system 12.

The "DETECTION OF EVENT" shown at the top right of FIG. 13A is performed at all times by the window manager 124 (FIG. 12). Note that in FIGS. 13A and 13B, the reference numerals attached to the processing steps (120, 121, 122, 123, and 124) show the entities executing the processing steps, that is, the graphic system kernel 120, the object interface 121, and data manager 122, the function manager 123, and the window manager 124.

The following (a), (b), (c) ... correspond to the processing steps (a), (b), (c) ... in FIGS. 13A and 13B.

(a) When an input event etc. occurs in the state waiting for an event, the graphic system kernel 120 (hereinafter referred to merely as "kernel") is activated.

(b) The kernel analyzes the event.

(c) If the result of the judgement of the event is an event from an operation window in the function request standby state, the routine proceeds to the processing step (d). If an event from a data window in the coordinate data input standby state, the routine proceeds to processing step (j).

(d) The requested function (verb object) is judged.

(e) The kernel requests to the object interface (IFO) and transforms from the generic function to actual function.

(f) Further, an inquiry is made to the IFO as to whether the function requires coordinate data or not and if it requires it, if the coordinate data is stored in the management facility (14 in FIG. 1A).

(g) If the result of the inquiry is that the coordinate data is not required, the routine proceeds to processing step (h), while if it is that the coordinate data is required, the routine proceeds to processing step (i).

(h) The execution of the function is requested to the IFO and the function is then executed. After this, the system waits for the next event at processing step (a).

(i) If coordinate data is required, the kernel is placed in the coordinate data input state and the next event is awaited.

(j) If the event is a data input event, it is judged if the data is coordinate data or control data. "Control data" is data that shows the end of the data input, for example.

(k) If control data, the routine proceeds to processing step (n), while if coordinate data, it proceeds to processing step (l).

(l) The IFO is asked to store the coordinate data.

(m) If execution of the function is possible by providing the coordinate data, the function is executed and the next event is awaited.

(n) If control data showing the end of the data input is input, the kernel is placed in the function request standby state and a request (event) is awaited.

In this graphic system, a multiwindow is used as the interface with the user. The windows are divided by function into four types: operation windows, data windows, message windows, and selection windows. The data windows and selection windows can be customized by the user by the definition sentences of the system description mentioned earlier.

Figure 14:
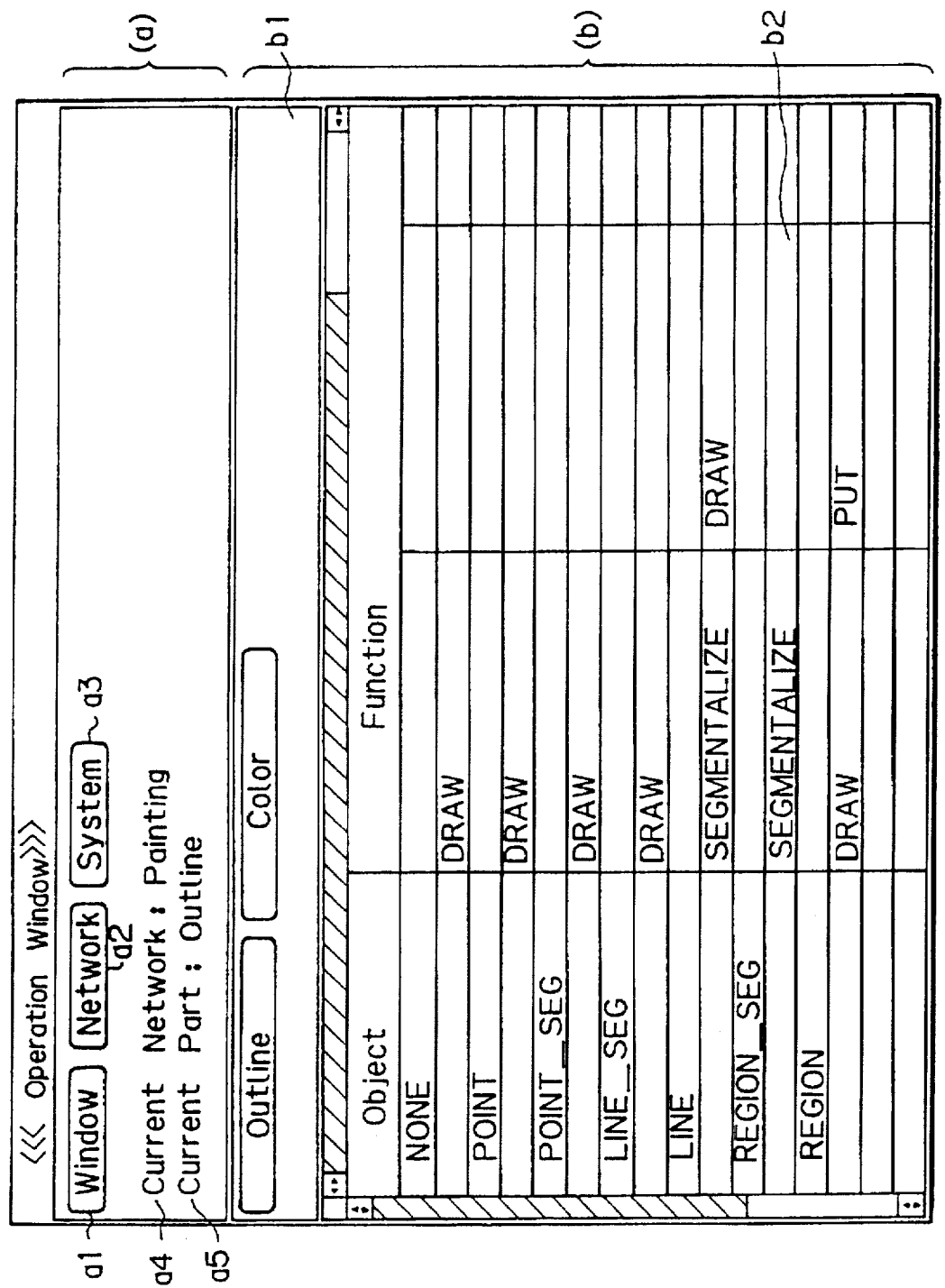
FIG. 14 is a view showing an example of an operation window in an embodiment of the present invention.

FIG. 14 shows an example of an operation window in an embodiment of the present invention. In the embodiment of the present invention, use is made of a multiwindow, a plurality of windows are displayed superposed on the display screen of the work station, and one window among them is hit using a mouse, for example, in accordance with the message. If this is done, the hit window is displayed on the majority of the display screen. FIG. 14 shows an example of the hitting of the network window among the plurality of windows.

In FIG. 14, (a) shows a control window for controlling the network windows, calling up the data windows, and controlling the system as a whole, while (b) shows a network window which displays the object network. Details on each part are given below:

(a) Control window a1 is a data window switch button. If this button is hit, the menu of the names of the data windows registered is displayed and it is possible to select the name of the data window desired to be called up at the front of the screen.

a2 is a network switch button. The graphic system is designed to enable use of a plurality of object networks. Since there is one network window, however, the technique of switching the network displayed is employed. If this button is pushed, a menu of the names of the networks registered is displayed and it is possible to select the network used.

a3 is a system button. Using this button, the system as a whole is controlled, including ending of the system and storage of states.

a4 is a network name display area. The name of the network currently selected is displayed here.

a5 is an item-attribute name display area. It displays the name of the item and attribute network of the currently selected network.

(b) Network window b1 is an item-attribute switching window. It switches the item-attribute network included in the currently selected network. The button displayed at the far left side is the item network button. Only one of these exists. The button shown at the right of this shows the name of the attribute network. A plurality of these may exist. If any of the buttons displayed is hit, the selected network is displayed on the display window of b2.

The display window b2 displays the object network and shows the state of the system, i.e., how far the network has gone and what operations can be performed from then on. The noun object name (for example, POINT) expressing the current position on the network is displayed in red letters, while the function name of the next executable noun object (for example, second DRAW from the top) is surrounded by a blue frame to distinguish it from others.

The user uses a mouse to hit the function name enclosed in the blue frame or hits one space below the name of the noun object (data name) displayed in red letters so as to request the operation to be next executed. To show to the user that the hit function is being executed, the display is inverted. When the function is finished being executed, the name of the data previously displayed in red letters and the name of the function enclosed in the blue frame and displayed inverted are redisplayed using black letters. Then, the next data on the network is displayed in red letters and the functions which can be executed for that data are enclosed in blue frames.

The objects are displayed or erased in the data window (not shown), the coordinate data is input, and other processing is performed in accordance with the operation designated at the operation window.

FIG. 14 shows the content of the left side column of FIG. 10 as one example. The display items of the left side column and the display items of FIG. 14 are reversed in order top to bottom. This is to enable an operator to activate the display items from top to bottom operating the system while viewing the display.

When activating the display items at the right side column in FIG. 10, the display items at the right side column are displayed in the region of (b) of FIG. 14.

Figure 15:
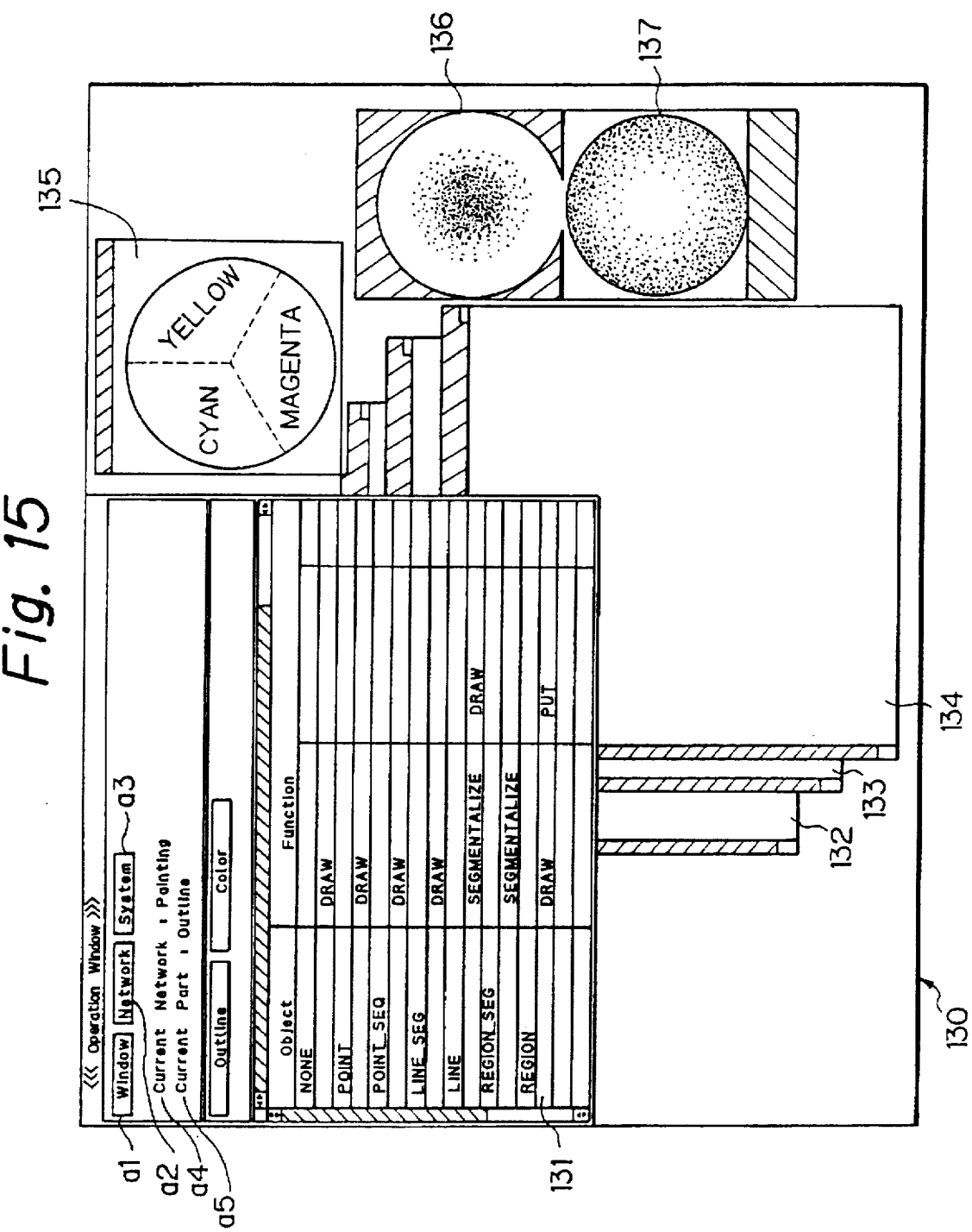
FIG. 15 is a view showing an example of an actual display of a multiwindow system as it appears.

FIG. 15 is a view showing an example of an actual display of a multiwindow system as it appears. In the figure, 130 is a display screen of a work station, for example, in which screen a plurality of windows 131 to 137 are formed. The window 131 is the window shown in FIG. 14. The windows 132 to 134 are the already mentioned data window, selection window, and message window. The window 135 is a color window for selection of the color, and 136 and 137 are contrast windows for designation of the contrast.

As explained above, according to the present invention, by making a model of a system of a specific field of application, such as a graphic system, as an object network, construction of the system becomes easy and the productivity of a software system is improved for the systems developer. Further, the state of the system and the executable operations can be presented to the user in an easily understandable form, so use of a user-friendly system becomes possible for the user and the operability is improved.

We claim:

1. A computer system using object networks comprising:

objects comprising at least a first object, data, and means for operating on the data;

a language processing system comprising object networks comprising the objects and classifying the objects into one of noun objects comprising at least a first noun object and a second noun object and corresponding to nodes comprising at least a first node and a second node and having relations comprising at least a first relation and a second relation, and verb objects corresponding to branches coupling the nodes and providing functions for specifying an operation to be executed by said noun objects, wherein the noun objects comprise:

individual objects corresponding to proper nouns, each individual object having a specific constraint, and integrated objects corresponding to common nouns and being an assembly of individual objects having a common specific constraint, the verb objects comprise:

operation verbs operating on the data and placing constraints on the first object to define the first object as one of the noun objects to be processed, relation added verbs acting on one of the integrated objects having the first relation and generating a second noun object having the second relation, and limited operation verbs combining the specific constraint provided by one of the noun objects with a preposition defining the property of the constraint and performing an operation on the one of the noun objects to be processed to satisfy the specific constraint, and one of the verb objects acts, in the direction of the branch corresponding to the name of the one of the verb objects, on the first noun object existing at the first node to obtain the second noun object to be processed; and a noun object management facility identifying among each of the objects by one of a naming function and a reference indication function for each of the integrated objects and the individual objects;

said computer system comprising a screen comprising operation windows displaying in condensed form the object networks to show said noun objects interactively with a user to indicate a reference to the noun objects so that a present status in execution of each of the noun objects is autonomously determined by software executed by the computer system, the operation windows comprising a data window indicating data to be processed to be defined as requested by the user, the thus defined data being used as attribute data for the noun objects being processed, and control being advanced to noun objects to be processed next.

2. A computer system using object networks comprising:

objects comprising at least a first object, data, and means for operating on the data;

a language processing system comprising object networks comprising the objects and classifying the objects into one of noun objects comprising at least a first noun object and a second noun object and corresponding to nodes comprising at least a first node and a second node and having relations comprising at least a first relation and a second relation, and verb objects corresponding to branches coupling the nodes and providing functions for specifying an operation to be executed by said noun objects, wherein the noun objects comprise:

individual objects corresponding to proper nouns, each individual object having a specific constraint, and integrated objects corresponding to common nouns and being an assembly of individual objects having a common specific constraint, the verb objects comprise:

operation verbs operating on the data and placing constraints on the first object to define the first object as one of the noun objects to be processed, relation added verbs acting on one of the integrated objects having the first relation and generating a second noun object having the second relation, and limited operation verbs combining the specific constraint provided by one of the noun objects with a preposition defining the property of the constraint and performing an operation on the one of the noun objects to be processed to satisfy the specific constraint, and one of the verb objects acts, in the direction of the branch corresponding to the name of the one of the verb objects, on the first noun object existing at the first node to obtain the second noun object to be processed; and a modification management facility adding the constraints to the noun objects as adjectives modifying the noun objects and managing them as objects, the modification management facility comprising a means for judging if the nature of the noun object to which the specified individual object belongs and the constraint modifying the same are compatible with each other;

said computer system comprising a screen comprising operation windows displaying in condensed form the object networks to show said noun objects interactively with a user to indicate a reference to the noun objects so that a present status in execution of each of the noun objects is autonomously determined by software executed by the computer system, the operation windows comprising a data window indicating data to be processed to be defined as requested by the user, the thus defined data being used as attribute data for the noun objects being processed, and control being advanced to noun objects to be processed next.

3. A computer system using object networks, comprising:

objects comprising at least a first object, data, and means for operating on the data;

a language processing system comprising object networks comprising the objects and classifying the objects into one of noun objects comprising at least a first noun object and a second noun object and corresponding to nodes comprising at least a first node and a second node and having relations comprising at least a first relation and a second relation, and verb objects corresponding to branches coupling the nodes and providing functions for specifying an operation to be executed by said noun objects, wherein the noun objects comprise:

individual objects corresponding to proper nouns, each individual object having a specific constraint, and integrated objects corresponding to common nouns and being an assembly of individual objects having a common specific constraint, the verb objects comprise:

operation verbs operating on the data and placing constraints on the first object to define the first object as one of the noun objects to be processed, relation added verbs acting on one of the integrated objects having the first relation and generating a second noun object having the second relation, and limited operation verbs combining the specific constraint provided by one of the noun objects with a preposition defining the property of the constraint and performing an operation on the one of the noun objects to be processed to satisfy the specific constraint, actual functions which can actually perform processing for execution of the noun object to be processed, generic functions which are transformed into actual functions by being given constraints, and one of the verb objects acts, in the direction of the branch corresponding to the name of the one of the verb objects, on the first noun object existing at the first node to obtain the second noun object to be processed, and a verb object control mechanism controlling the transformation from the generic functions to the actual functions, said computer system further comprising a screen comprising operation windows displaying in condensed form the object networks to show said noun objects interactively with a user to indicate a reference to the noun objects so that a present status in execution of each of the noun objects is autonomously determined by software executed by the computer system, the operation windows comprising a data window indicating data to be processed to be defined as requested by the user, the thus defined data being used as attribute data for the noun objects being processed, and control being advanced to noun objects to be processed next.

4. A computer system using object networks as set forth in claim 3, wherein the verb object control mechanism imposes as a constraint on the verb object corresponding to a generic function the name of the noun object, as the status name, on which processing has finished being executed.

5. A computer system using object networks as set forth in claim 3, further comprising a function execution management facility, which comprises means for imposing constraints for the start, duration, and end of an operation when causing the verb object to act as a function and for defining the actual constraints for the generic functions with constraints given by generic conditions, therefore sequentially checking validity in the process of transforming generic functions to actual functions and generating transformation procedures for transformation.

6. A computer system using object networks comprising:

objects comprising at least a first object, data, and means for operating on the data;

a language processing system comprising object networks comprising the objects and classifying the objects into one of noun objects comprising at least a first noun object and a second noun object and corresponding to nodes comprising at least a first node and a second node and having relations comprising at least a first relation and a second relation, and verb objects corresponding to branches coupling the nodes and providing functions for specifying an operation to be executed by said noun objects, wherein the noun objects comprise:

individual objects corresponding to proper nouns, each individual object having a specific constraint, and integrated objects corresponding to common nouns and being an assembly of individual objects having a common specific constraint, the verb objects comprise:

operation verbs operating on the data and placing constraints on the first object to define the first object as one of the noun objects to be processed, relation added verbs acting on one of the integrated objects having the first relation and generating a second noun object having the second relation, and limited operation verbs combining the specific constraint provided by one of the noun objects with a preposition defining the property of the constraint and performing an operation on the one of the noun objects to be processed to satisfy the specific constraint, and one of the verb objects acts, in the direction of the branch corresponding to the name of the one of the verb objects, on the first noun object existing at the first node to obtain the second noun object to be processed;

a process construction management facility generating the individual objects by execution of specific actual functions from the state of integrated objects corresponding to the common nouns in the object network showing a structure as a reference model and constructs an element network comprising elements by expressing the relations among the elements, which element network performs actual processing by requests for execution of individual objects, thereby generating and managing the object networks;

said computer system comprising a screen comprising operation windows displaying in condensed form the object networks to show said noun objects interactively with a user to indicate a reference to the noun objects so that a present status in execution of each of the noun objects is autonomously determined by software executed by the computer system, the operation windows comprising a data window indicating data to be processed to be defined as requested by the user, the thus defined data being used as attribute data for the noun objects being processed, and control being advanced to noun objects to be processed next.

7. A computer system using object networks as set forth in claim 6, wherein the process construction management facility defines the constraints relating to a processing routine by the orientation of the verb objects in the object network formed and, at the same time, judges that the verb object with a possibility token indicating that the object is next executable can be processed concurrently, and receives a request for actuation for the verb object and performs control for concurrent processing so as to actually execute the same.

8. A computer system using object networks as set forth in claim 6, wherein the verb objects of the object network having the portion defining the construction are actuated, the corresponding element network is created, the data relating to the element object is added as a constraint, and the process is executed based on the requests from inside and outside the system for the verb objects and the limitations concerning the processing routine and based on the indication control of the process construction management facility.

9. A computer system using object networks as set forth in claim 6, wherein the process construction management facility further comprises control means for newly generating a structure network based on the structure network used as the reference model, modifying and revising the constraints of the object network used as the reference model in accordance with other system requests, defining constraints of the newly generated structure network, and preparing to receive from other systems the requests to element networks based on the processing routine to be performed by the structure network completed as a result, thereby assigning a right of control to the element network, receiving a fact of completion of the processing as a result, and erasing the structure network, which operation is designed so that the element network is simultaneously completed, the results of the processing being displayed in other systems.

10. A computer system using object networks as set forth in claim 6, further comprising a function execution management facility pairing requests and responses, such as one of a request for processing for generation of a structure network from the processing construction management facility and a resultant response and a request for processing for generation of the element network from the structure network and a response to the same, and performing services repeating a request to a lower layer network or a response to a higher layer network, and the function execution management facility performs transformations from generic functions to actual functions and control of an indication for checking validity during execution, wherein if the checking result of the validity indicates incomplete, a new pair of a request and response is conversely issued to a higher layer network to complete the same, while if the checking result of the validity indicates complete, the transformation is executed and processing is performed for the response to the higher layer network.

* * * * *

UNITED STATES PATENT AND TRADEMARK OFFICE
CERTIFICATE OF CORRECTION

PATENT NO. : 5,682,542

DATED : October 28, 1997

INVENTOR(S) : ENOMOTO et al.

It is certified that error appears in the above-identified patent and that said Letters Patent is hereby corrected as shown below:

Title Page, Col. 2, line 11, change "Cooeprative" to --Cooperative--.

Title Page, Page 2, delete the entire second column.

Col. 10, line 16, change "made" to --formed--.

Col. 11, line 39, begin a new paragraph with "The";
line 55, delete the large space between "Numerical" and "values".

Col. 12, line 4, change "X" to --> <--;
line 7, change "X" to --> <--.

Col. 14, between lines 59 and 60 insert the follow line --;< Definition of Selection Window>;--.

UNITED STATES PATENT AND TRADEMARK OFFICE
CERTIFICATE OF CORRECTION

PATENT NO. : 5,682,542
DATED : October 28, 1997
INVENTOR(S) : ENOMOTO et al.

It is certified that error appears in the above-identified patent and that said Letters Patent is hereby corrected as shown below:

Col. 16, line 20, change "}" to --{--;
        line 21, change " = " (two occurrences) to -- =  = --;
        line 22, change " = " to -- =  = --;
        line 23, change " = " to -- =  = --;
        line 24, change " = " (two occurrences) to -- =  = --;
        line 25, change " = " to -- =  = --;
        line 26, change " = " to -- =  = --;
        line 27, change " = " (two occurrences) to -- =  = --;
        line 28, change " = " to -- =  = --;
        line 29, change " = " to -- =  = --;
        line 30, change " = " (two occurrences) to -- =  = --;
        line 31, change " = " to -- =  = --;
        line 32, change " = " to -- =  = --;
        line 33, change " = " (two occurrences) to -- =  = --;
        line 34, change " = " to -- =  = --;
        line 35, change " = " to -- =  = --;
        line 36, change " = " (two occurrences) to -- =  = --;
        line 37, change " = " to -- =  = --;
        line 38, change " = " to -- =  = --.

Signed and Sealed this

Twenty-fourth Day of March, 1998

*Attest:*

BRUCE LEHMAN

*Attesting Officer*      *Commissioner of Patents and Trademarks*